United States Patent
Kamiya et al.

(10) Patent No.: US 7,350,882 B2
(45) Date of Patent: Apr. 1, 2008

(54) VEHICLE BRAKE DEVICE

(75) Inventors: Masahiko Kamiya, Kariya (JP); Taro Segawa, Kariya (JP); Takaaki Matsuhashi, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 197 days.

(21) Appl. No.: 11/076,116

(22) Filed: Mar. 9, 2005

(65) Prior Publication Data

US 2005/0200199 A1    Sep. 15, 2005

(30) Foreign Application Priority Data

Mar. 10, 2004  (JP) .............................. 2004-068134
Jan. 6, 2005   (JP) .............................. 2005-001567

(51) Int. Cl.
    *B60T 8/66* (2006.01)
(52) U.S. Cl. ..................................... 303/157
(58) Field of Classification Search .................... 303/1, 303/157
    See application file for complete search history.

(56) References Cited

U.S. PATENT DOCUMENTS

| | | | | |
|---|---|---|---|---|
| 4,172,603 A | * | 10/1979 | St. Clair et al. | ............. 280/734 |
| 5,647,647 A | * | 7/1997 | Kato et al. | ............. 303/122.09 |
| 5,737,919 A | * | 4/1998 | Gautier et al. | ................ 60/403 |
| 5,927,821 A | * | 7/1999 | Bauer et al. | ..................... 303/1 |
| 6,309,031 B1 | * | 10/2001 | Crombez et al. | ........ 303/113.4 |
| 6,364,433 B1 | * | 4/2002 | Stemer | ....................... 303/138 |
| 6,565,160 B1 | * | 5/2003 | Ewing et al. | ................... 303/1 |
| 6,672,682 B2 | * | 1/2004 | Baker et al. | .................... 303/1 |
| 6,893,102 B2 | * | 5/2005 | Michon | ...................... 303/191 |
| 6,945,610 B1 | * | 9/2005 | Mizutani et al. | ......... 303/114.1 |

FOREIGN PATENT DOCUMENTS

| | | |
|---|---|---|
| JP | 10-305764 | 11/1998 |
| JP | 2000-272495 | 10/2000 |
| JP | 2001-88668 | 4/2001 |
| JP | 2002-104153 | 4/2002 |
| JP | 2002-283987 | 10/2002 |
| JP | 2002-293229 | 10/2002 |

* cited by examiner

*Primary Examiner*—Thomas Williams
(74) *Attorney, Agent, or Firm*—Buchanan Ingersoll & Rooney PC

(57) ABSTRACT

A vehicle brake device A is provided with a master cylinder 10, a reservoir tank 12, solenoid valves 46 and 48 for adjustably draining brake oil from outlet ports 10a, 10b of the master cylinder 10 to the reservoir tank 12, a collision detection sensor 68 for detecting a collision of the vehicle, a fluid pressure meter 61 for detecting the master cylinder pressure, and an ECU 70. The ECU 70 detects the pushing-up of the brake pedal 11 based on the occurrence of a collision and the master cylinder pressure, and upon detection of the pushing-up, controls the solenoid valves 46 and 48 to adjust the draining of the brake oil so that the brake pedal 11 is withdrawn. Thus, a time point when the brake pedal 11 begins to be pushed up by the cause of the vehicle collision can be detected accurately and reliably, and the brake pedal 11 can be withdrawn accurately in dependence on the pushing-up. This reliably secures an anchorage upon which the driver keeps his body balance and reliably prevents an excess load from being exerted on the driver.

9 Claims, 10 Drawing Sheets

VEHICLE BRAKE DEVICE

This application claims priority under 35 U.S.C. 119 with respect to Japanese Applications No. 2004-068134 and No. 2005-001567 respectively filed on Mar. 10, 2004 and Jan. 6, 2005.

BACKGROUND OF THE INVENTION

1. Field of the Invention

The present invention relates to a vehicle brake device for braking a vehicle by the stepping manipulation of a brake pedal.

2. Discussion of the Related Art

Heretofore, in vehicle brake devices of this kind, where an impact of more than a predetermined magnitude is exerted on a vehicle at the time of a crash, collision or the like, the rearward displacements of an engine and the like cause a master cylinder to be displaced rearward. This may results in pushing up a brake pedal in a rearward direction, i.e., toward the driver, whereby an excessive load may be applied onto the driver's foot. To cope with this, there have been known those in which upon detection of a collision, brake oil in a master cylinder is forced to be flown to a reservoir tank to retract or withdraw the brake pedal away from the driver's foot (e.g., refer to patent documents 1 to 3 cited below).

[Patent Document 1] Japanese unexamined, published patent No. 2002-283987 (pp. 5-6, FIG. 3)

[Patent Document 2] Japanese unexamined, published patent No. 2000-272495 (pp. 2-4, FIG. 1)

[Patent Document 3] Japanese unexamined, published patent No. 10-305764 (pp. 2-4, FIGS. 1-2)

In a vehicle brake device described in the patent document 1, when an impact beyond a predetermined magnitude acts on a vehicle, an oil pump is rotated to compulsorily make brake fluid (brake oil) in a master cylinder flow toward an ABS reservoir, and thus, a brake pedal is controlled to be withdrawn toward the master cylinder side, that is, toward the forward side of the vehicle.

Further, in a vehicle brake device described in the patent document 2, when an impact beyond a predetermined value acts on a vehicle, the atmospheric air is flown into a variable pressure chamber of a brake booster, and operating oil is drained to a reservoir from oil supply conduits through which oil pressures generated in a master cylinder are applied to wheel cylinders. Thus, a brake pedal is turned in a stepping direction.

Further, in a vehicle brake device described in the patent document 3, an oil pressure relief valve which is controllable by an electronic control unit in dependence on an output from an acceleration sensor is provided between a master cylinder operable by a brake pedal and brake cylinders for braking wheels, and upon detection of an acceleration indicating a collision of the vehicle, the oil pressure relief valve is opened to relive the brake pressure.

In each of the aforementioned vehicle brake devices, the brake pedal is withdrawn immediately upon detection of a collision, that is, the brake pedal is withdrawn before it is actually pushed up. Thus, it may occur that during the time period from a time point of the vehicle collision to another time point of the pushing-up of the brake pedal, the driver tries to keep his body balance, but cannot have anything to rely on.

SUMMARY OF THE INVENTION

Accordingly, it is a primary object of the present invention to provide an improved vehicle brake device which is capable of reliably detecting a time point when a brake pedal begins to be pushed up upon collision of the vehicle and of withdrawing the brake pedal accurately in dependence upon the degree of the pushing-up motion so that an anchorage for the driver to keep his body balance can be reliably secured and so that an excess load can be reliably prevented from being exerted on the driver.

Briefly, according to the present invention, there is provided a vehicle brake device for braking a vehicle by the stepping manipulation of a brake pedal. The vehicle brake device comprises collision detection means for detecting a collision of the vehicle; pedal pushing-up detection means for detecting the pushing-up of the brake pedal which is being stepped by the driver after a time point of the vehicle collision; and pedal control means for withdrawing the brake pedal when the pushing-up of the brake pedal is detected by the pedal pushing-up detection means.

With this construction, upon collision of the vehicle, the pedal control means withdraws the brake pedal for the first time after the pushing-up of the brake pedal is detected by the pedal pushing-up detection means. Thus, where the collision is of the degree that the brake pedal is not pushed up, the brake pedal is not withdrawn. Where the collision is of the degree that the brake pedal is pushed up, on the contrary, the brake pedal is not withdrawn during the time period from the collision of the vehicle to the detection of the brake pedal pushing-up, and then, is withdrawn upon detection of the pushing-up. Therefore, the brake pedal can be withdrawn timely, i.e., at an exact or appropriate time, and it can be realized to reliably secure an anchorage on which the driver's body balance is kept and to reliably prevent an excess force from being exerted on the driver.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
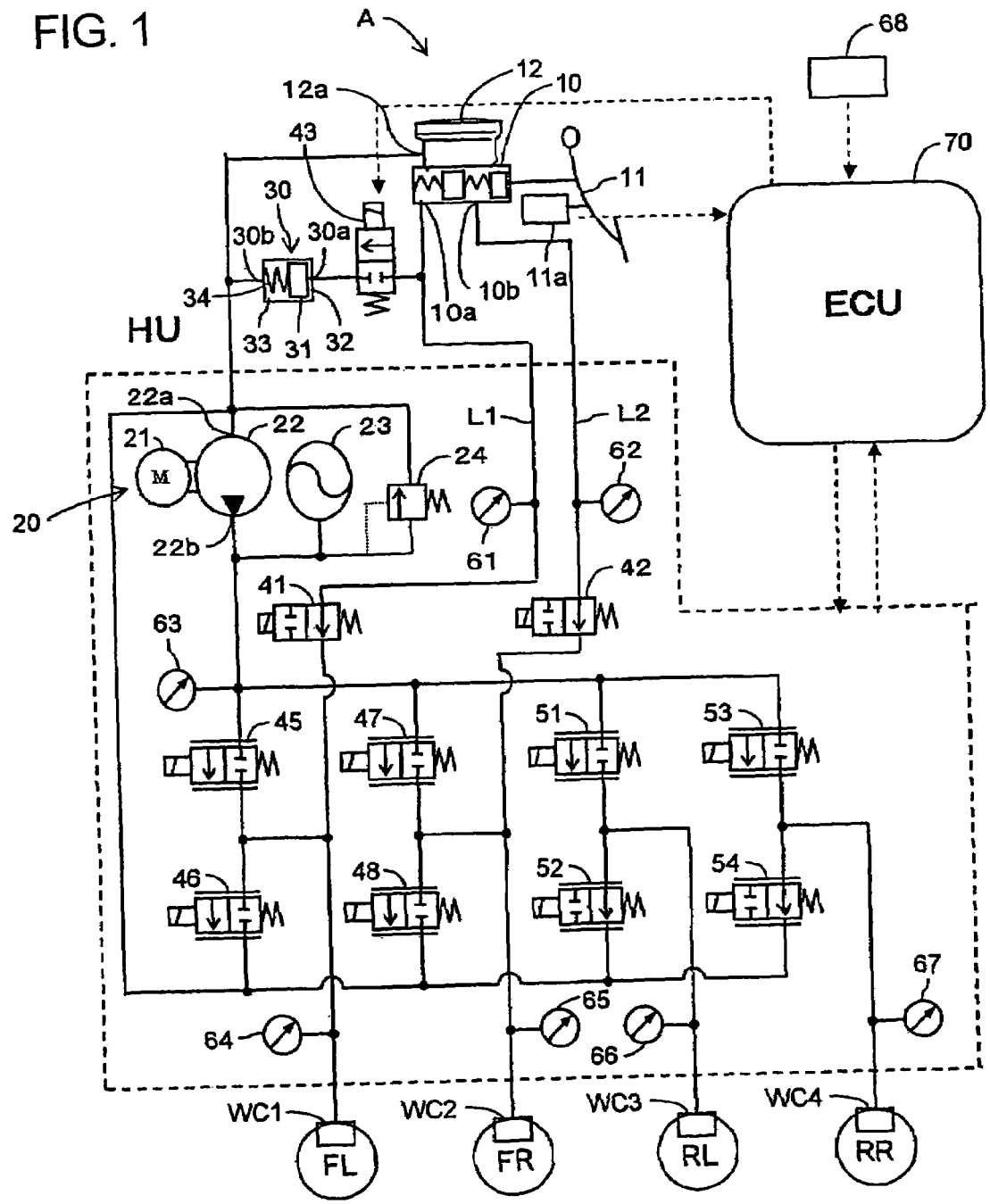
FIG. 1 is a schematic circuit diagram of a vehicle brake device in a first embodiment according to the present invention.

A vehicle brake device in a first embodiment according to the present invention will be described hereinafter with reference to the accompanying drawings. As shown in FIG. 1, a vehicle brake device A in this embodiment is of a so-called "brake-by-wire type" and in particular, is of the type having a mechanical stroke simulator. The device A is provided with a master cylinder 10 for generating the fluid pressure which depends on the stepping state of a brake pedal 11, and a pressurized fluid supply source 20 provided independently of the master cylinder 10 for supplying pressurized fluid to wheel cylinders WC1, WC2, WC3 and WC4 which respectively restrict rotations of left and right front wheels FL, FR and left and right rear wheels RL, RR of a vehicle (not shown). The brake device A is constructed so that in the normal (i.e., properly operating) state of the pressurized fluid supply source 20, the pressurized fluid whose pressure depends upon the brake pedal stepping force is supplied from the pressurized fluid supply source 20 to the wheel cylinders WC1-WC4 for the left and right front wheels FL, FR and the left and right rear wheels RL, RR of the vehicle and that in the abnormal (i.e., not properly operating) state of the pressurized fluid supply source 20, required pressurized fluid is supplied to the wheel cylinders WC1, WC2 of the left and right front wheels FL, FR of the vehicle from the master cylinder 10 which is operatively connected to the brake pedal 11. And, in the vehicle brake device A constructed as described above, there is provided a stroke simulator 30 for enabling the brake pedal 11 to move through a stroke of the length corresponding to the stepping state of the brake pedal 11 in the normal state of the pressurized fluid supply source 20.

The vehicle brake device A is provided with the master cylinder 10 capable of feeding two steams of brake oil (liquid) of substantially the same pressure from first and second outlet ports 10a, 10b in dependence on the stepping amount of the brake pedal 11. The first outlet port 1Oa of the master cylinder 10 communicates with the wheel cylinder WC1 through an oil pressure line L1. The oil pressure line L1 has a solenoid valve 41 thereon, and the first outlet port 10a is in communication with the wheel cylinder WC1 for the front left wheel FL through the solenoid valve 41 when the same is in the de-energized state (the illustrated state). The second outlet port 10b of the master cylinder 10 communicates with the wheel cylinder WC2 through another oil pressure line L2. The oil pressure line L2 has a solenoid valve 42 thereon, and the second outlet port 10b is in communication with the wheel cylinder WC2 for the front right wheel FR through the solenoid valve 42 when the same is in the de-energized state (the illustrated state).

When selectively de-energized or energized, the solenoid valves 41, 42 are controllably changed over to make the master cylinder 10 communicate with or blocked from the wheel cylinders WC1, WC2. That is, these solenoid valves 41, 42 serve as master cylinder cutting valves as master cylinder cutting means which are closed to block the communication of the master cylinder 10 with the wheel cylinders WC1, WC2 when energized in the normal state of the pressurized fluid supply source 20 and which are opened to make the master cylinder 10 communicate with both of the wheel cylinders WC1, WC2 when de-energized in the abnormal state of the pressurized fluid supply source 20. The vehicle brake device A is further provided with a pedal stroke sensor 11a, which is connected to the brake pedal 11 for detecting the moving amount (stroke amount or pedal stroke) of the brake pedal 11.

The stroke simulator 30 is connected to be able to communicate with a portion between the master cylinder 10 and the solenoid valve 41 on the oil pressure line L1, and a solenoid valve 43 is provided between the master cylinder 10 and the stroke simulator 30. The stroke simulator 30 is of the mechanical type which is well-known as described in, e.g., Japanese unexamined, published patent application No. 2002-293229 and operates to absorb the pressurized fluid supplied from the first outlet port 10a of the master cylinder 10. A piston 31 is fluid-tightly and slidably arranged in the stroke simulator 30, and first and second fluid pressure chambers 32, 33 are defined by being partitioned by the piston 31. The first fluid pressure chamber 32 is provided with an inlet port 30a communicating with the first outlet port 10a of the master cylinder 10 through the solenoid valve 43, and the stroke simulator 30 is supplied with the brake oil from the master cylinder 10 through the inlet port 30a. The second oil pressure chamber 33 is provided with an outlet port 30b communicating with an inlet port 12a of a reservoir tank 12 and permits the brake oil overflowed therefrom to be returned to the reservoir tank 12 through outlet port 30b. Further, the second oil pressure chamber 33 contains therein a spring 34, which urges the piston 31 against the oil pressure supplied from the master cylinder 10 in the communication state with the master cylinder 10. Instead, it is possible to make the second oil pressure chamber 33 as an atmospheric pressure chamber.

The solenoid valve 43 is operable to block the first outlet port 10a of the master cylinder 10 from the inlet port 30a of the stroke simulator 30 when in the de-energized state (the illustrated state) and to make the both ports 10a and 30a communicate with each other when in the energized state. Further, the solenoid valve 43 operates as a stroke simulator cutting valve constituting simulator cutting means which is energized and opened in the normal state of the pressurized fluid supply source 20 for bringing the master cylinder 10 and the stroke simulator 30 into communication and which is de-energized and closed in the abnormal state of the pressurized fluid supply source 20 for blocking the communication between the master cylinder 10 and the stroke simulator 30.

The pressurized fluid supply source 20 is composed of an electric motor 21, a pump 22 and an accumulator 23. The pump 22 is driven by the electric motor 21 and discharge from a discharge port 22b thereof the brake oil of the reservoir tank 12 which it draws from a suction port 22a thereof communicating with the inlet port 12a of the reservoir tank 12. The accumulator 23 is in communication with the discharge port 22b of the pump 22 so that it stores high pressure brake oil supplied from the pump 22 to retain the brake oil always at a predetermined fluid pressure and supplies the brake oil to the wheel cylinders WC1-WC4 whenever required. Between the suction and discharge ports 22a, 22b of the pump 22, there is interposed a relief valve 24, which is operable to be closed when the pressure of the brake oil discharged from the pump 22 is less than a predetermined value and to be opened when it becomes the predetermined value or higher. Thus, the pressurized fluid supply source 20 supplies the wheel cylinders WC1-WC4 with the brake fluid of the predetermined high pressure.

The pressurized fluid supply source 20 communicates with the wheel cylinder WC1 for the front left wheel FL through a solenoid valve 45 when the same is in the energized state. The solenoid valve 45 is controllable by being energized to change over the open/close operation and when in the de-energized state (the illustrated state), blocks the pressurized fluid supply source 20 from the wheel cylinder WC1. The wheel cylinder WC1 communicates with the reservoir tank 12 through a solenoid valve 46 when the same is in the energized state. The solenoid valve 46 is controllable by being energized to change over the open/close operation and when in the de-energized state (the illustrated state), blocks the wheel cylinder WC1 from the reservoir tank 12.

Further, the pressurized fluid supply source 20 communicates with the wheel cylinder WC2 for the front right wheel FR through a solenoid valve 47 when the same is in the energized state. The solenoid valve 47 is controllable by being energized to change over the open/close operation and when in the de-energized state (the illustrated state), blocks the pressurized fluid supply source 20 from the wheel cylinder WC2. The wheel cylinder WC2 communicates with the reservoir tank 12 through a solenoid valve 48 when the same is in the energized state. The solenoid valve 48 is controllable by being energized to change over the open/close operation and when in the de-energized state (the illustrated state), blocks the wheel cylinder WC2 from the reservoir tank 12.

Further, the pressurized fluid supply source 20 communicates with the wheel cylinder WC3 for the rear left wheel RL through a solenoid valve 51 when the same is in the energized state. The solenoid valve 51 is controllable by being energized to change over the open/close operation and when in the de-energized (the illustrated state), blocks the pressurized fluid supply source 20 from the wheel cylinder WC3. The wheel cylinder WC3 communicates with the reservoir tank 12 through a solenoid valve 52 when the same is in the de-energized state (the illustrated state). The solenoid valve 52 is controllable by being energized to change over the open/close operation and when in the energized state, blocks the wheel cylinder WC3 from the reservoir tank 12.

Further, the pressurized fluid supply source 20 communicates with the wheel cylinder WC4 for the rear right wheel RR through a solenoid valve 53 when the same is in the energized state. The solenoid valve 53 is controllable by being energized to change over the open/close operation and when in the de-energized state (the illustrated state), blocks the pressurized fluid supply source 20 from the wheel cylinder WC4. The wheel cylinder WC4 communicates with the reservoir tank 12 through a solenoid valve 54 when the same is in the de-energized state (the illustrated state). The solenoid valve 54 is controllable by being energized to change over the open/close operation and when in the energized state, blocks the wheel cylinder WC4 from the reservoir tank 12. The aforementioned solenoid valves 45, 47, 51 and 53 constitute pressure increasing means for bringing the respective wheel cylinders WC1-WC4 into communication with or blocking from the pressurized fluid supply source 20, whereas the aforementioned solenoid valves 46, 48, 52 and 54 constitute pressure reducing means for bringing the respective wheel cylinders WC1-WC4 into communication with or blocking from the reservoir tank 12. In the present embodiment, the solenoid valves 46 and 48 (pressure reducing means) constitute drain means. Further, it is more preferable to replace the foregoing solenoid valves 45-48, 51-54 by those of the type which is capable of controlling a pressure difference across itself in proportion to an electric current applied thereto.

The vehicle brake device A is further provided with fluid pressure meters 61-67. The fluid pressure meter 61 is provided for detecting the fluid pressure of brake oil in the oil pressure line L1 supplied from the first outlet port 10a of the master cylinder 10. The fluid pressure meter 62 is provided for detecting the fluid pressure of brake oil in the oil pressure line L2 supplied from the second outlet port 10b of the master cylinder 10. The fluid pressure meters 61 and 62 serves as means (i.e., stepping state detection means) for detecting the master cylinder pressure representing the stepping state of the brake pedal 11. The fluid pressure meter 63 is provided for detecting the fluid pressure of brake oil supplied from the pressurized fluid supply source 20. And, the fluid pressure meters 64-67 are provided for detecting the fluid pressures of brake oils supplied to or drained from the wheel cylinders WC1-WC4, respectively.

Further, the vehicle brake device A is provided with a collision detection sensor 68. The collision detection sensor 68 serves means (i.e., collision detection means) for detecting the collision of the vehicle, and a sensor for operating an airbag for example may also be used as the collision detection sensor 68.

The vehicle brake device A is also provided with an ECU (Electronic Control Unit) 70, which has connected thereto the pedal stroke sensor 11a, the electric motor 21, the solenoid valves 41-43, 45-48 and 51-54, the fluid pressure meters 61-67 and the collision detection sensor 68 which have been mentioned above. The ECU 70 has also connected thereto a vehicle speed sensor for detecting the body speed of the vehicle, a steering sensor for detecting the steering angle of the vehicle, a shift switch incorporated in a shift lever for detecting the shift position of the vehicle, an accelerator sensor assembled with a gas pedal (not shown) for detecting the opening degree of the vehicle accelerator, and a yaw rate sensor for detecting a yaw rate acting on the vehicle (all not shown). By controlling the open/close operations of the solenoid valves 41-43, 45-48 and 51-54 of the vehicle brake device A or by controlling electric currents applied thereto based on the detection signals from these sensors and the state of the shift switch, the ECU 70 controls the fluid pressures applied to the wheel cylinders WC1-WC4, that is, the brake forces applied to the respective wheels FL, FR, RL and RR. Further, by executing a program corresponding to a flow chart shown in FIG. 2, the ECU 70 detects the pushing-up of the brake pedal 11 which is being stepped by the driver after a time point of the vehicle collision and withdraws the brake pedal 11 upon detection of the vehicle collision.

Also in FIG. 1, those components encircled by a broken line are built up as a single assembly to constitute a hydraulic unit generally indicated at HU.

(Operation)

Next, brief description will be made regarding the general operation of the vehicle brake device A as constructed above. In the normal state or properly operating state of the pressurized fluid supply source 20, the stepping of the brake pedal 11 causes the solenoid valves 41, 42 which have been in the open state, to be closed. This results in blocking the supply of the brake oil from the master cylinder 10 to the wheel cylinders WC1, WC2. At this time, the solenoid valve 43 which has been in the closed state is opened, and the brake oil from the master cylinder 10 is supplied to the stroke simulator 30. Also, each of the wheel cylinders WC1-WC4 is supplied with the brake oil of the pressure depending on a pedal stroke detected by the pedal stroke sensor 11a. More specifically, the solenoid valves 52, 54 are closed, the solenoid valves 46, 48 remain in the closed state, and the solenoid valves 45, 47, 51, 53 are opened, so that high pressure brake oil from the pressurized fluid supply source 20 is supplied to each of the wheel cylinders WC1-WC4.

On the other hand, when the brake pedal 11 having been steeped on is released, the brake oil in the first oil pressure chamber 32 of the stroke simulator 30 is returned to the master cylinder 10 through the solenoid valve 43. Further, the brake oils within the wheel cylinders WC1-WC4 are returned to the reservoir tank 12 through the solenoid valves 46, 48, 52, 54 because of the openings of the solenoid valves 46, 48, 52, 54 and because of the closings of the solenoid valves 45, 47, 51, 53, respectively.

In the abnormal state or not properly operating state of the pressurized fluid supply source 20, the solenoid valves 41-43, 45-48, 51-54 are controlled to be all in the de-energized state. That is, the solenoid valve 43 blocks the master cylinder 10 from the stroke simulator 30, the solenoid valves 41 and 42 bring the first and second outlet ports 10a, 10b of the master cylinder 10 into communication respectively with the wheel cylinders WC1, WC2, and the solenoid valves 45-48 remain closed. Thus, when the brake pedal 11 is stepped on, the brake oil in the master cylinder 10 is supplied to the wheels cylinders WC1, WC2 through the solenoid valves 41, 42. On the other hand, when the brake pedal 11 having been stepped on is released, the brake oils in the wheel cylinders WC1, WC2 are returned to the master cylinder 10 respectively through the solenoid valves 41 and 42.

Further, the operation which the aforementioned vehicle brake device A performs upon collision of the vehicle will be described in detail in accordance with a flowchart shown in FIG. 2 and the time charts shown in FIG. 3. It is now assumed that in the vehicle brake device A, the pressurized fluid supply source 20 is kept normal and that a predetermined brake force control has been performed until the collision of the vehicle occurs. While an ignition switch (not shown) of the vehicle is kept in ON-state, the ECU 70 repetitively executes a program corresponding to the flow chart. Each time the execution of the program is started at step 100 in FIG. 2, judgment is made at step 102 as to whether or not the collision of the vehicle has occurred. More specifically, the vehicle is judged not to have come into collision unless the collision detection sensor 68 detects the collision of the vehicle, whereas the vehicle is judged to have come into collision if the collision detection sensor 68 detects the collision of the vehicle. Until the collision of the vehicle occurs, the ECU 70 makes judgment of "NO" and repetitively executes the processing at steps 102 and 104. Assuming that during the execution of this repetitive processing, the collision of the vehicle has occurred with the brake pedal 11 being stepped on by the driver to brake the vehicle, the master cylinder pressure before a time point (time t1) of the collision is a fluid pressure P1 corresponding to the stepping force at that time.

At step 104, the ECU 70 executes the predetermined brake control. That is, it keeps the master cylinder cutting valves (solenoid valves) 41 and 42 in the closed state and controls the solenoid valves 45-48 and 51-54 so that the pressurized fluid from the pressurized fluid supply source 20 is supplied to the wheel cylinders WC1-WC4 thereby to generate the brake force depending on the stepping state of the brake pedal 11.

Figure 3:
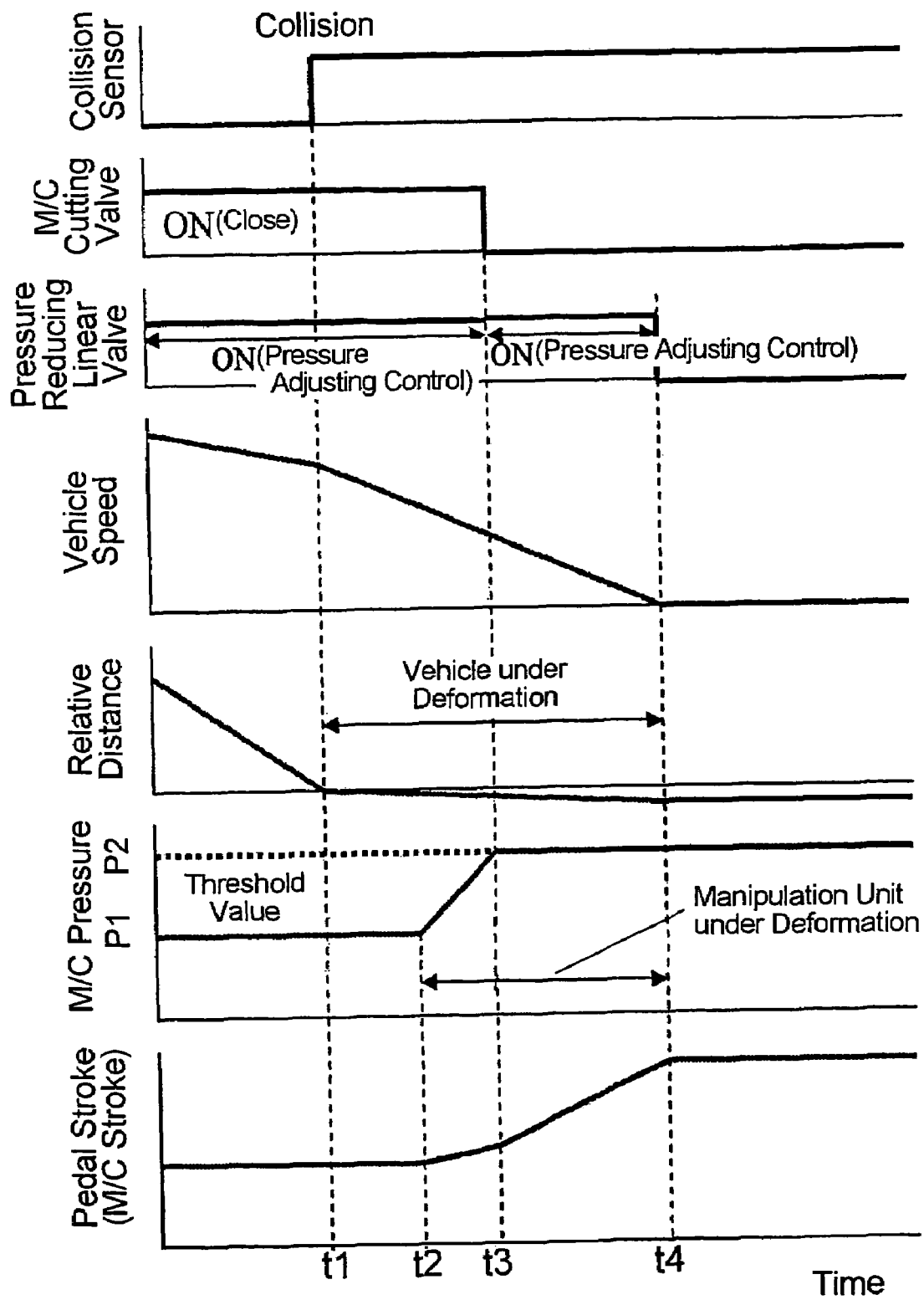
FIG. 3 is a gather of various time charts showing the operation of the vehicle brake device in the first embodiment according to the present invention.

When the collision of the vehicle occurs at the time point (t1) in the time charts shown in FIG. 3, the ECU 70 makes judgment of "YES" at step 102 to advance the program to step 106. At step 106, the ECU 70 detects the pushing-up of the brake pedal 11 having been stepped on by the driver, based on the master cylinder pressure representing the stepping state of the brake pedal 11 (pedal pushing-up detection means). More specifically, the ECU 70 detects the master cylinder pressure (M/C pressure) by the fluid pressure meter 61 or 62, judges that the brake pedal 11 has not been pushed up when the detected master cylinder pressure is lower than a predetermined or set value P2, and judges that the pushing-up of the brake pedal 11 has begun when the predetermined value P2 is attained, that is, that the brake pedal 11 is being pushed up when the master cylinder pressure is equal to or greater than the set value P2. Until the ECU 70 detects the pushing-up of the brake pedal 11, it makes judgment of "NO" and repetitively executes the processing steps 106 and 108. The set value P2 has been set to provide a predetermined state wherein there is being generated a pedal reaction force necessary to keep the driver's body balance and wherein any excessive force is not being exerted on the driver's foot.

In the mid course of the repetitive processing and during the period from the collision time point (time t1) to another time point (time t2) when the engine and the like reach the master cylinder 10, it does not occur that the master cylinder 10 is moved rearward by being pushed by the engine and the like, and thus, the brake pedal 11 does not move relative to the master cylinder 10, so that the master cylinder pressure remains at the same fluid pressure P1 as it had at the collision time point (time t1). Subsequently to the time point (time t2) at which the engine and the like reach the master cylinder 10, the master cylinder 10 is moved rearward by being pushed by the engine and the like, whereas by being stepped by the driver, the brake pedal 11 connected to the master cylinder 10 has been made to be difficult to be moved rearward. As a consequence, since the brake pedal 11 is relatively moved to be plunged against the master cylinder 10, the pedal stroke begins to increase as indicated by the pedal stroke (M/C (master cylinder) stroke) in FIG. 3, whereby the master cylinder pressure increases from the fluid pressure P1 remaining at the collision time point (time t1).

The ECU 70 executes the predetermined brake control at step 108. More specifically, the ECU 70 keeps the master cylinder cutting valves (solenoid valves) 41 and 42 in closed state and controls the solenoid valves 45-48 and 51-54 to supply the pressurized fluid from the pressurized fluid supply source 20 to the wheel cylinders WC1-WC4 and to generate a brake force in dependence on the stepping state of the brake pedal 11.

When the master cylinder pressure increases to reach the predetermined or set value P2 during the execution of the repetitive processing, the ECU 70 detects the pushing-up of the brake pedal 11 (time t3). Then, at step 106, the ECU 70 makes judgment of "YES" to advance the program to step 110, and through the processing at step 110 and those following thereto, withdraws the brake pedal 11 while keeping the stepping state of the brake pedal 11 in the predetermined state, namely while maintaining the master cylinder pressure at the set value P2. More specifically, at step 110, the ECU 70 opens at least one of the master cylinder cutting valves 41 and 42 which have been closed until the time point t3. Then, until the vehicle speed is reduced to a predetermined or set speed (e.g., 0 km/h) or lower (time point t4), the ECU 70 controls the open/close operation of the solenoid valve 46 (or 48) which is a drain valve (drain means) corresponding to the opened master cutting valve 41 (or 42) so that the draining of the brake oil from the master cylinder 10 to the reservoir tank 12 can be adjusted to keep the master cylinder pressure at the set value P2 (steps 112 and 114).

That is, between the time t3 and time t4, the master cylinder 10 is pushed by the engine and the like to be moved further rearward, and the brake pedal 11 is relatively moved to be further plunged against the master cylinder 10. This causes the pedal stroke to further increase as shown by the pedal stroke (M/C (master cylinder) stroke) in FIG. 3. On the other hand, since the brake oil is drained from the master cylinder 10 to the reservoir tank 12 to keep the master cylinder pressure at the set value P2, the master cylinder pressure is not increased with increases in the brake pedal stroke and is kept at the set value P2 (refer to master cylinder (M/C) pressure in FIG. 3).

Further, between the time t3 and time t4, the ECU 70 closes the solenoid valves 52 and 54 to supply the pressurized fluid from the pressurized fluid supply source 20 to the wheel cylinders WC3 and WC4 and controls the solenoid valves 51-54 to generate a brake force depending on the stepping state of the brake pedal 11. With this control, as described above, it can be realized to execute, independently of each other, a reaction force retention control by the use of the brake system (one brake system) for the front wheels FL, FR when the brake pedal 11 is withdrawn upon collision of the vehicle and an ordinary brake control by the use of the brake system (the other brake system) for the rear wheels RL, RR, and therefore, it can be realized to execute the reaction force retention control with the ordinary brake force being retained to some extent.

Then, when the vehicle speed is reduced to the predetermined or set speed (e.g., 0 km/h) or lower (time t4), the ECU 70 makes judgment of "YES" at step 112 to advance the program to step 116 and terminates the open/close control of the aforementioned solenoid valve 46 (or 48) at step 116.

As understood from the foregoing description, in the first embodiment, the ECU 70 (pedal control means) closes the solenoid valves 41 and 42 (master cylinder cutting means) to restrain the draining of the brake oil from the master cylinder 10 from the time point (time t1) when the collision of the vehicle occurs to the time point (time t3) when the pushing-up of the brake pedal 11 is detected. Subsequently to the time point (time t3) when the pushing-up of the brake pedal 11 is detected, the ECU 70 opens at least one of the solenoid valves 41 and 42 and controls the solenoid valve (pressure reducing means) 46 (or 48) corresponding to the opened solenoid valve 41 (or 42) to adjust the draining of the brake oil from the master cylinder 10 to the reservoir tank 12, so that the brake pedal 11 is withdrawn with the master cylinder pressure (stepping state of the brake pedal 11) being maintained at the set value P2 (in the predetermined state). Accordingly, upon collision of the vehicle, the ECU 70 causes the brake pedal 11 to be withdrawn for the first time when the pushing-up of the brake pedal 11 is detected (steps 106, 110-114: pedal pushing-up detection means). Therefore, since the master cylinder cutting means remains closed where the collision is of the degree that the brake pedal 11 is not pushed up, the brake oil is not drained to the reservoir tank 12, so that the brake pedal 11 is not withdrawn. Where the collision is of the degree that the brake pedal 11 is pushed up (i.e., at crash level), the brake pedal 11 is not withdrawn from the time when the collision of the vehicle occurs to the time when the pushing-up of the brake pedal is detected, and then, the brake pedal 11 is withdrawn when the pushing-up of the same is detected. Consequently, the brake pedal 11 can be withdrawn at an exact or appropriate time, and it can be realized to reliably secure an anchorage on which the driver's body balance is kept and to reliably prevent an excess force from being exerted on the driver.

The pedal pushing-up detection means is able to detect the pushing-up of the brake pedal 11 accurately and reliably because it detects the pushing-up of the brake pedal 11 based on the master cylinder pressure detected by the fluid pressure meters 61 and 62.

Although in the foregoing first embodiment, the reaction force retention control is executed in dependence on the pushing-up amount of the brake pedal 11 (the master cylinder pressure), the criterion for initiating the reaction force retention control may be altered based on the urgency for the control, e.g., the variation amount of the pushing-up amount of the brake pedal 11.

Figure 4:
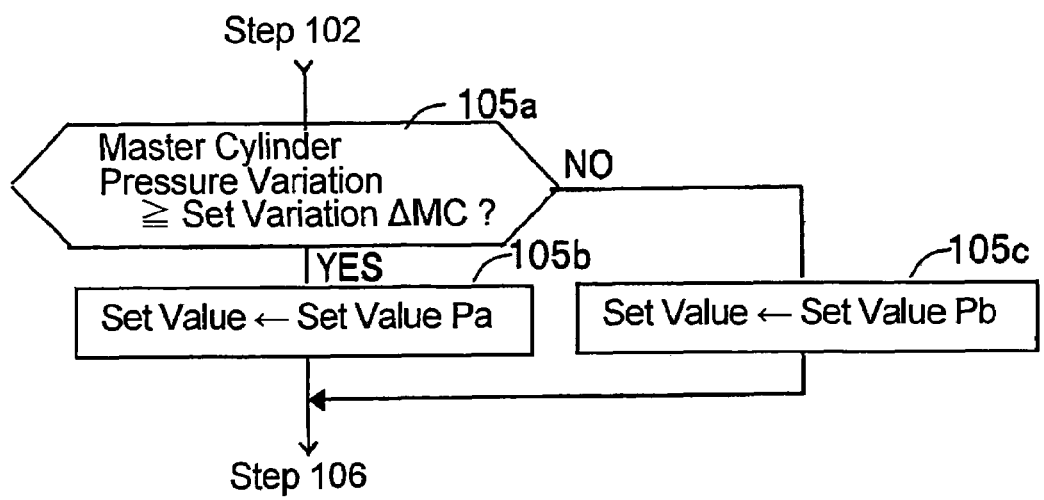
FIG. 4 is a partial flow chart of a modified control program executed by the ECU shown in FIG. 1.

That is, where the master cylinder pressure increases abruptly, the control becomes necessary urgently, and the responsiveness to the control has to be hastened. In this event, as shown in FIG. 4, the urgency is judged to be great, so that the criterion for initiating the reaction force retention control (i.e., the predetermined or set value P2 for comparison with the master cylinder pressure at step 106) is altered to a smaller predetermined or set value Pa (steps 105a and 105b). Where the urgency is judged not to be great, on the contrary, the criterion for initiating the reaction force retention control (i.e., the set value P2 for comparison with the master cylinder pressure at step 106) is altered to a larger predetermined or set value Pb (steps 105a and 105c). At step 105a, the urgency for the control is judged by judging whether or not the variation amount in the master cylinder pressure is equal to or greater than a predetermined or set variation amount ΔMC. That is, the urgency is judged to be great if the variation amount in the master cylinder pressure is equal to or greater than the set variation amount ΔMC, but not to be great if the variation amount in the master cylinder pressure is less than the set variation amount ΔMC. Then, at step 106, the reaction force retention control is judged to be initiated or not to be initiated by the use of the set value (set value Pa or Pb) set by the processing at step 105b or 105c. With this configuration, the reaction force retention control can be executed with the responsiveness being properly altered in dependence on the deformation state (the pushing-up state) of the brake pedal 11 which is one state indicative of the states of the vehicle and the driver, namely in dependence on the urgency for the control.

Figure 5:
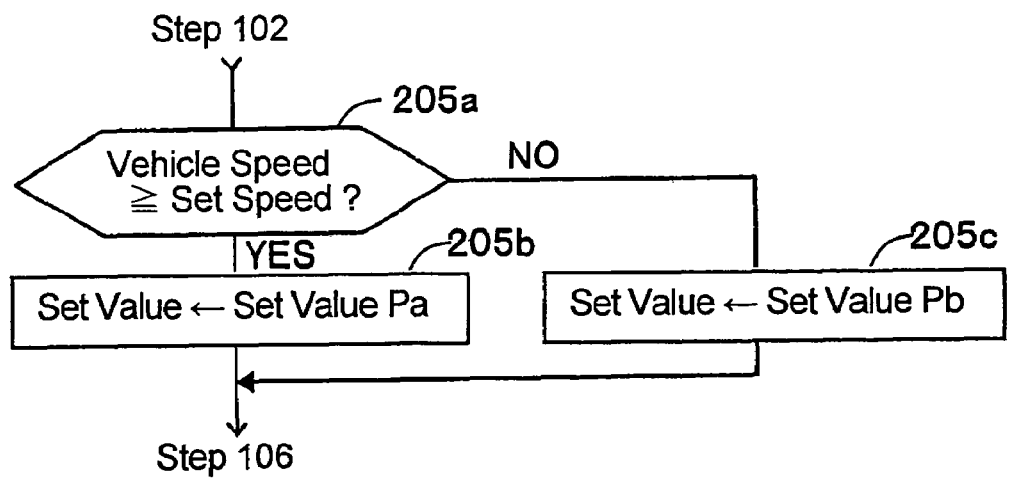
FIG. 5 is a partial flow chart of another modified control program executed by the ECU shown in FIG. 1.

Further, it may be possible to judge the urgency for the control in dependence not on the variation amount of the master cylinder pressure but on another state pertaining to the urgency for the control, e.g., the vehicle body speed (vehicle speed). This is because it is generally thought that the higher the vehicle speed is, the greater the urgency for the control becomes. In this case, as shown in FIG. 5, the criterion for initiating the reaction force retention control is altered to the smaller set value Pa when the urgency is judged to be great (steps 205a and 205b), but is altered to the larger set value Pb when the urgency is judged not to be great (steps 205a and 205c). At step 205a, the urgency for the control is judged by judging whether or not the vehicle speed is equal to or greater than a predetermined or set speed. That is, the urgency for the control is judged to be great when the vehicle speed is equal to or higher than the set speed, but is judged not to be great when the vehicle speed is lower than the set speed. With this configuration, the reaction force retention control can be executed with the responsiveness being properly altered in dependence on the speed of the vehicle in traveling, namely the urgency for the control.

In other modified forms, the urgency (i.e., the criterion for initiating the reaction force retention control) may be altered in a plural-stepwise manner in dependence on the variation amount of the master cylinder pressure or the vehicle speed, or the urgency (i.e., the criterion for initiating the reaction force retention control) may be continuously altered in dependence on the variation amount of the master cylinder pressure and based on a map which is prepared in advance to represent the correlation between the variation amount of the master cylinder (or the vehicle speed) and the urgency.

The processing at the foregoing steps 105a-105c and the processing at the step 106 may be combined to detect the pushing-up of the pedal 11.

Further, the ECU 70 withdraws the brake pedal 11 while keeping the master cylinder pressure (stepping state of the brake pedal 11) at the set value P2 (in the predetermined state). Thus, after the brake pedal 11 begins to be pushed up, it is not withdrawn abruptly, but is withdrawn with a suitable pedal reaction force being maintained, so that an anchorage on which the driver's body balance is kept can be secured reliably and so that an excessive load can be reliably prevented from being exerted on the driver.

Since the predetermined or set value P2 (predetermined state) is set to provide the state in which there is being generated a pedal reaction force necessary for the driver to keep his body balance and in which an excessive force is not being exerted on the driver's foot, it can be realized to reliably secure an anchorage on which the driver's body balance is kept and to reliably prevent an excess force from being exerted on the driver.

Further, utilizing the existing collision detection sensor as collision detection means, the existing fluid pressure meters 61 and 62 as pedal pushing-up detection means and the existing solenoid valves 46 and 48 as drain valves, the first embodiment is not required to be provided with new additional devices. Thus, the foregoing operations and advantages can be accomplished without resulting in increases in cost.

In the foregoing first embodiment, the fluid pressure meters 61 and 62 which are capable of detecting the master cylinder pressure are employed as the stepping state detection means. However, the stepping state detection means is not limited to these elements and may be constituted to use a stepping force sensor which detects the stepping force on the brake pedal 11. In this case, the pushing-up of the brake pedal 11 may be detected by comparing the pedal stepping force with a predetermined value.

Also in the foregoing first embodiment, the solenoid valves 46 and 48 serving as drain valves are controlled to be opened or closed simultaneously. However, a modification may be made so that one of the solenoid valves is first controlled to drain all of the brake oil in a hydraulic system to which the solenoid valve is connected and so that the other solenoid valve is controlled thereafter.

Regarding the solenoid valves 46 and 48 serving as drain valves, these valves may be controlled in dependence on the urgency for the reaction force retention control as described with reference to FIGS. 4 and 5. For example, when the urgency is great as is the case for example that the variation amount of the master cylinder pressure is large or that the vehicle is traveling at a high speed, the responsiveness may be further heightened by executing the reaction force retention control by the use of both of the solenoid valves 46 and 48.

Further, in order to heighten the responsiveness in the reaction force retention control, the ECU 70 may be programmed to execute a particular control only after detecting the collision of the vehicle. During execution of the ordinary brake control, the CPU 70 executes various judgments (processing for slip, processing for vehicle behavior, cooperation with a hybrid ECU and the like) based on many pieces of input information (e.g., yaw rate, steering angle, road wheel speeds, pedal stroke and the like) from various sensors and hence, needs a processing time which is somewhat long (e.g., 6 milliseconds) for each processing. To avoid this inconvenience, after detecting the collision, the ECU 70 may be concentrated to execute the reaction force retention control based on minimum necessary sensor information (e.g., the master cylinder pressure) only and may be made not to process other sensor information. By being so programmed or constructed, the ECU 70 is enabled to heighten the responsiveness in control within a limited time period from the collision detection to the occurrence of the pedal pushing-up (or to the time when the vehicle is stopped without the occurrence of the pedal pushing-up). In this case, the control logic for the ECU 70 may be switched from one for operating in the ordinary traveling to another for operating in the event of the collision detection, or the ECU 70 may be provided with a hardwired circuit dedicated to the reaction force retention control.

Although not shown in the foregoing first embodiment, a temperature sensor for measuring the temperature (surrounding temperature) may be provided so that the brake fluid is warmed up (heated or given heat) when the detected temperature is low (such as in winter). By heightening the temperature of the brake fluid, the viscosity resistance of the brake fluid can be lowered, whereby the responsiveness in the reaction force retention control can be enhanced particularly at the urgent time.

Also, in the foregoing first embodiment, the reaction force retention control executed in withdrawing the brake pedal 11 upon collision of the vehicle is performed by the brake system for the front wheels, whereas the ordinary brake control is performed by the brake system for the rear wheels, and the reaction force retention control and the ordinary brake control are performed independently of each other. However, by replacing the brake systems for the front wheels and the rear wheels with each other, it is possible to execute the reaction force retention control in withdrawing the brake pedal 11 upon collision of the vehicle by the use of the brake system for the rear wheels and to execute the ordinary brake control by the use of the brake system for the front wheels independently of the reaction force retention control. Specifically, this can be realized by making an arrangement so that the wheel cylinders WC3 and WC4 for the rear wheels RL, RR communicate respectively with the first and second outlet ports 10a and 10b of the master cylinder 10.

Figure 6:
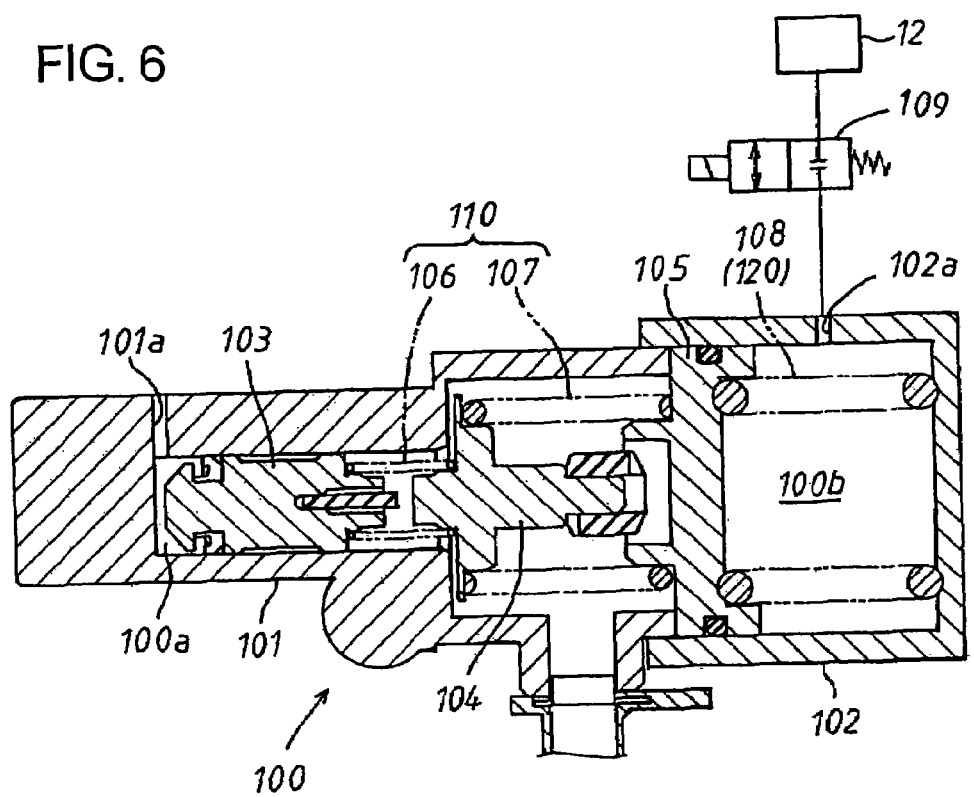
FIG. 6 is a sectional view showing another form of a stroke simulator shown in FIG. 1.

Further, in the foregoing first embodiment, the stroke simulator 30 can be replaced by another stroke simulator 100 shown in FIG. 6. This stroke simulator 100 is of the type that a predetermined pedal manipulation force to pedal stroke property is provided by utilizing the urging force of a main resilient member 110 and is further provided with a sub-resilient member 120 which generates its urging force in the same direction as the main resilient member 110 does. The stroke simulator 100 provides the predetermined pedal manipulation force to pedal stroke property by the urging force of the main resilient member 110 when the pedal manipulation force is lower than a predetermined load and also provides a withdrawal property which is another pedal manipulation force to pedal stroke property, different from the predetermined pedal manipulation force to pedal stroke property, by the urging force of the sub-resilient member 120 when the pedal manipulation force is equal to or greater than the predetermined load.

Specifically, the stroke simulator 100 is composed of first and second housings 101 and 102 taking cup shapes and secured to each other at their open ends, a first piston 103 arranged fluid-tightly and slidably in the first housing 101, a second piston 104 arranged slidably in the first housing 101, a third piston 105 arranged fluid-tightly and slidably in the second housing 102, a first spring 106 interposed between the first piston 103 and the second piston 104, a second spring 107 interposed between the second piston 104 and the third piston 105, and a third spring 108 interposed between the third piston 105 and a bottom wall inner surface of the second housing 102.

The first to third springs 106-108 are arranged in series to have their urging forces acting in the same direction as one another. The second spring 107 has its spring constant set to be largest, and the first and third springs 106, 108 are set so that their spring constants are almost same or the spring constant of the third spring 108 is smaller. The first and second springs 106, 107 collectively constitute the main resilient member 110 and the third spring 108 constitutes the sub-resilient member 120. The main and sub-resilient members 110, 120 may be constituted by rubber members in place of the springs.

The stroke simulator 100 is provided with a first fluid pressure chamber 100a defined by the first housing 101 and the first piston 103 and a second fluid pressure chamber 100b defined by the second housing 102 and the third piston 105. The first fluid pressure chamber 100a is in communication with the first outlet port 10a of the master cylinder 10 through a first port 101a thereof and the solenoid valve 43. The second fluid pressure chamber 100b is in communication with the reservoir tank 12 through a second port 102a thereof and an additional solenoid valve 109 as switching means. The solenoid valve 109 is of the normally closed type and is controlled to be opened or closed by a command from the ECU 70. This solenoid valve 109 may be replaced by a pressure switch which opens upon receiving a predetermined pressure.

Figure 7:
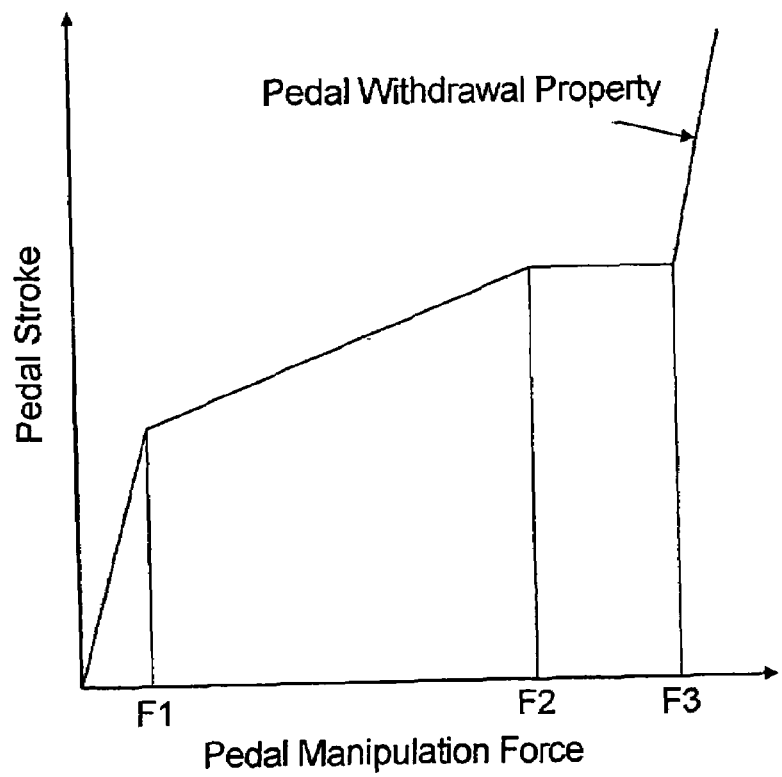
FIG. 7 is a graph showing a pedal manipulation force to pedal stroke property of the stroke simulator shown in FIG. 6.

The operation of the stroke simulator 100 as constructed above will be described hereafter. First of all, description will be made regarding the operation in the case of the solenoid valve 109 being closed, e.g., in the case that the ordinary brake manipulation is performed and in the case that the urgency is low in executing the pedal withdrawal control (reaction force retention control). When the brake pedal 11 is stepped on by the driver, the first piston 103 is pressured in dependence on the stepping state, namely, the master cylinder pressure applied from the master cylinder 10 to the first fluid pressure chamber 100a and approaches to the second piston 104 against the urging force of the first spring 106. Upon further stepping of the brake pedal 11, the first piston 103 comes into contact with the second piston 104 (time point of pedal manipulation force F1 in FIG. 7), and both pistons 103, 104 are further pressured bodily to approach to the third piston 105 against the urging force of the second spring 107. When the brake pedal 11 is further stepped on, the second piston 104 comes into contact with the third piston 105 (time point of pedal manipulation force F2), which however is not moved even when pressured because the solenoid valve 109 remains closed. Thus, the brake pedal 11 does not move thereafter even when stepped on further (refer to FIG. 7). Herein, a pedal manipulation force to pedal stroke property in which the pedal stroke increases with increases in the pedal manipulation force and which comes stable thereafter is referred to as "ordinary simulator property".

On the other hand, in the case that the solenoid valve 109 is opened, that is, when the solenoid valve 109 is opened as the manipulation force of the brake pedal 11 reaches another manipulation force (load) F3 larger than the manipulation force (F2), the third piston 105 which remained secured until then begins to move, and the first to third pistons 103-105 are bodily pressured by the master cylinder pressure to be moved toward the right as viewed in FIG. 6 against the urging force of the third spring 108. Herein, another pedal manipulation force to pedal stroke property in which the pedal stroke increases again when the pedal manipulation force is gained to the predetermined load (manipulation force F3) or more after coming stable in this way (after time point of the manipulation force F2) is referred to as "withdrawal property". The manipulation force F3 is desirable to be set to a larger value than a stepping force which is applied for the ordinary brake manipulation and is also desirable to be set to a value corresponding to a pedal pushing-up force which is to be prevented from being exerted on the driver's foot in the abnormal event such as collision or the like.

In this manner, the stroke simulator 100 provides the ordinary pedal force to pedal stroke property by the urging force of the main resilient member 110 when the pedal manipulation force is lower than the predetermined load (manipulation force F3) and also provides the withdrawal property different from the ordinary simulation property by the urging force of the sub-resilient member 120 when the pedal manipulation force is equal to or greater than the predetermined load (manipulation force F3).

With this configuration, when the operation of the solenoid valve 41 (or 42) serving as master cylinder cutting means is delayed somewhat, the master cylinder pressure is heightened extraordinarily due to the movement of the master cylinder 10 caused by the collision, in which case the solenoid valve 109 is switched from a closed state to an open state upon detection of such an extraordinary increase in the master cylinder pressure. Thus, the restraint on the third piston 105 is released to make the sub-resilient member 120 (third spring 108) compressed and also to make the length of the pedal stroke of the brake pedal 11 larger than that in the ordinary state, so that the brake pedal 11 can be withdrawn in a shorter time period with the retention of the driver's body balance.

In the foregoing embodiment, the switching of the simulator property to the withdrawal property is realized by switching the solenoid valve 109. However, there may be taken another construction that the third piston 105 is not moved so far as the pedal manipulation force remains within a range used in ordinary brake operations, but is moved to compress the third spring 108 only when the pedal manipulation force comes to equal to or greater than the predetermined load (manipulation force F3) upon the vehicle collision. This can be realized for example by providing in the second fluid chamber 100b a latch device for restraining the movement of the third piston 105 until the predetermined pedal manipulation force (manipulation force F3) is reached or by enabling the third piston 105 to initiate movement only when it is detected that the second piston 104 has come into contact with the third piston 105 or only when the third piston 105 receives a pushing force from the second piston 104.

Furthermore, the modified embodiment has been described to implement in combination a method of adjusting the draining of the brake oil to the reservoir tank 12 by controlling the solenoid valve 41 (or 42) as master cylinder cutting means and the solenoid valve 46 (or 48) as pressure reducing means and in addition, another method of providing the withdrawal property to the stroke simulator itself. However, the present invention is not limited to the form which implements the both methods in combination. Rather, the objects of the present invention can be accomplished equally in the form that either of the methods is implemented individually.

Second Embodiment

Figure 8:
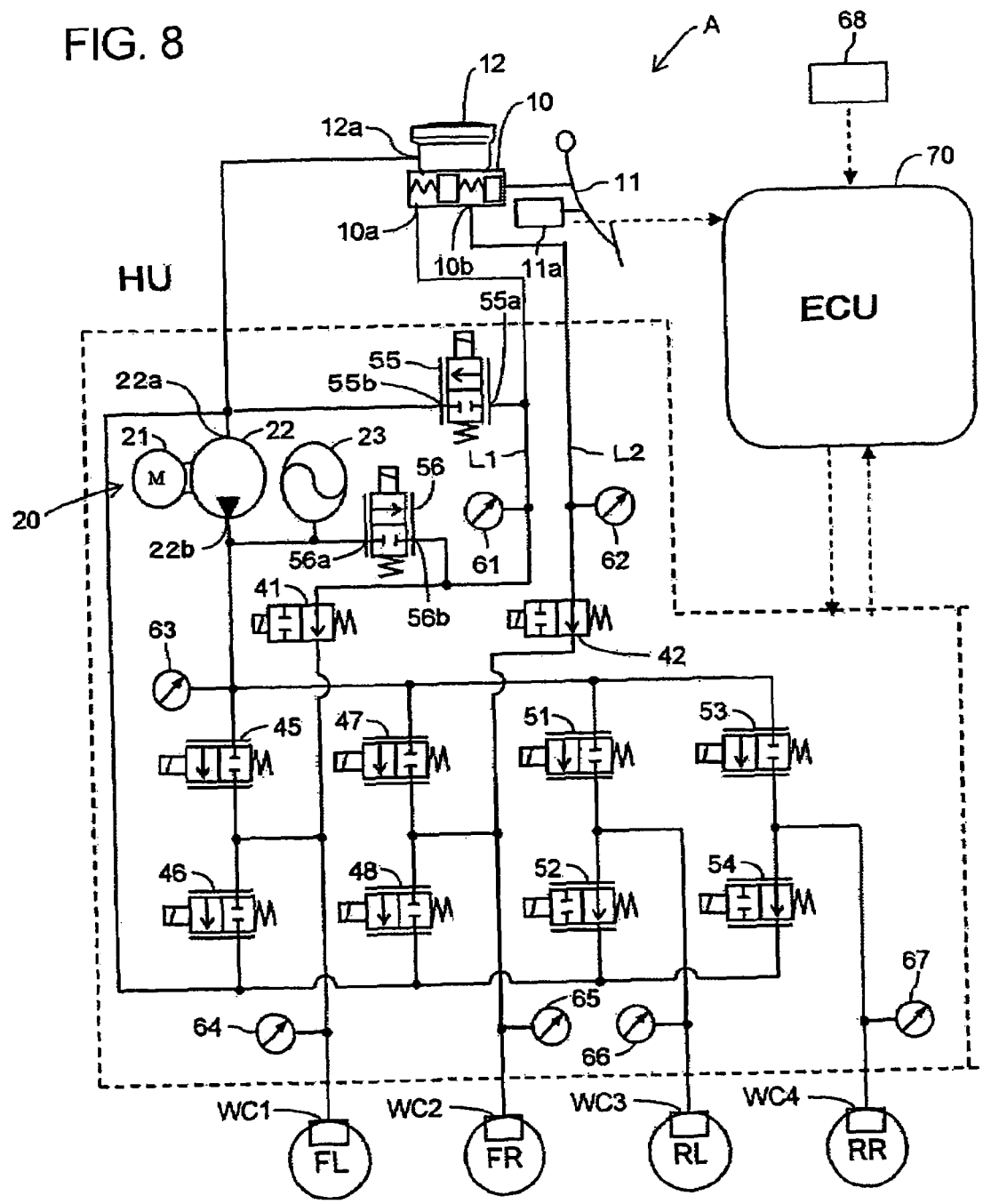
FIG. 8 is a schematic circuit diagram of a vehicle brake device in a second embodiment according to the present invention.

Hereinafter, a vehicle brake device in a second embodiment according to the present invention will be described with reference to FIG. 8. FIG. 8 is a fluid circuit diagram showing the schematic construction of the vehicle brake device A in this embodiment. The components in the second embodiment which are identical to those in the first embodiment are given the same reference numerals as used in the first embodiment and are omitted from being described in detail. Therefore, the following description is addressed to the respects which are different from those in the first embodiment.

Although in the foregoing first embodiment, description has been made taking examples wherein the present invention is applied to the hydraulic type vehicle brake device of so-called "brake-by-wire type" and in particular, to that of the type having a mechanical stroke simulator, the present invention may be applied to a vehicle brake device of the type that a stroke simulator used therein is not mechanical but is constituted by controlling the open/close motion of a solenoid valve. In this case, as shown in FIG. 8, the vehicle brake device A is provided with a solenoid valve 55 as stepping reaction force generation means between the master cylinder 10 and the reservoir tank 12 for generating a reaction force for the bake pedal 11 in dependence on the brake pedal stepping state which is detected by the stepping state detection means when the brake pedal 11 is stepped on. The vehicle brake device A is also provided with another solenoid valve 56 as releasing reaction force generation means between the fluid pressure supply source 20 and the master cylinder 10 for generating a reaction force for the brake pedal 11 in dependence on the brake pedal stepping state which is detected by the stepping state detection means when the brake pedal 11 having been stepped is released. In this embodiment, the stepping reaction force generation means operates as drain means (drain valve). Further, it is more preferable that each of these solenoid valves 55 and 56 is of the type that it is able to control the pressure difference across itself in proportion to an electric current applied thereto.

An electric current to each of the solenoid valves 55 and 56 is controlled so that a controlled difference pressure corresponding to the pedal manipulation state of the brake pedal 11 is generated between both ports 55*a* and 55*b* or between both ports 56*a* and 56*b*. More specifically, when the brake pedal 11 is stepped on, the ECU 70 closes the solenoid valve 41 and the second difference pressure control valve 56 and controls the electric current to the first difference pressure control valve 55 so that the controlled difference pressure corresponding to the pedal manipulation state of the brake pedal 11 is generated between both ports 55*a* and 55*b*. Since the first outlet port 10*a* of the master cylinder 10 is brought into communication with the inlet port 12*a* of the reservoir tank 12, it results that a controlled difference pressure depending on the pedal stepping state is generated at the first outlet port 10 of the master cylinder 10. On the other hand, when the brake pedal is released, the ECU 70 maintains the closed state of the solenoid valve 41, closes the first difference pressure control valve 55 and controls the electric current to the second difference pressure control valve 56 so that a controlled difference pressure depending on the pedal stepping state is generated between both ports 56*a* and 56*b*. Since the fluid pressure supply source 20 and the first outlet port 10*a* of the master cylinder 10 are brought into communication, it results that a controlled difference pressure depending on the pedal stepping state is generated at the first outlet port 10*a* of the master cylinder 10. The solenoid valve 55 as the stepping reaction force generation means also serves as drain means in this embodiment.

Next, description will be made regarding the operation which the vehicle brake device A in the second embodiment as constructed above performs when a collision of the vehicle occurs. When detecting the collision of the vehicle, the ECU 70 blocks the solenoid valves 41 and 42 as the master cylinder cutting means and controls the solenoid valve 55 as the stepping reaction force generation means and the solenoid valve 56 as the releasing reaction force generation means based on the predetermined reaction force to stroke property thereby to suppress the draining of the brake oil from the master cylinder 10 to that for the corresponding stroke during the period from a time point of the vehicle collision to another time point of the braking pedal pushing-up. Thus, the brake pedal 11 is caused to remain at a stepping position corresponding to that for the brake manipulation. Further, subsequently to the time point when the pushing-up of the brake pedal 11 is detected, the ECU 70 controls the stepping reaction force generation means thereby to adjust the draining of the brake oil from the master cylinder 10 to the reservoir tank 12, so that the brake pedal 11 is withdrawn as the stepping state of the brake pedal 11 (master cylinder pressure) detected by the stepping state detection means is kept in the predetermined state (at the set value P2). Accordingly, the same functions and advantages as those in the first embodiment can be achieved in this second embodiment.

Further, in the foregoing first embodiment, the reaction force retention control in withdrawing the brake pedal 11 upon the vehicle collision and the ordinary brake control are performed respectively by the front wheel brake system and the rear wheel brake system independently of each other. However, this second embodiment is constructed to independently perform the ordinary brake control by the front and rear brake systems and the reaction force retention control in withdrawing the brake pedal 11 upon the vehicle collision by the stepping reaction force generation means. Therefore, in the second embodiment, the reaction force retention control can be performed with the ordinary brake force being held completely.

Third Embodiment

Figure 9:
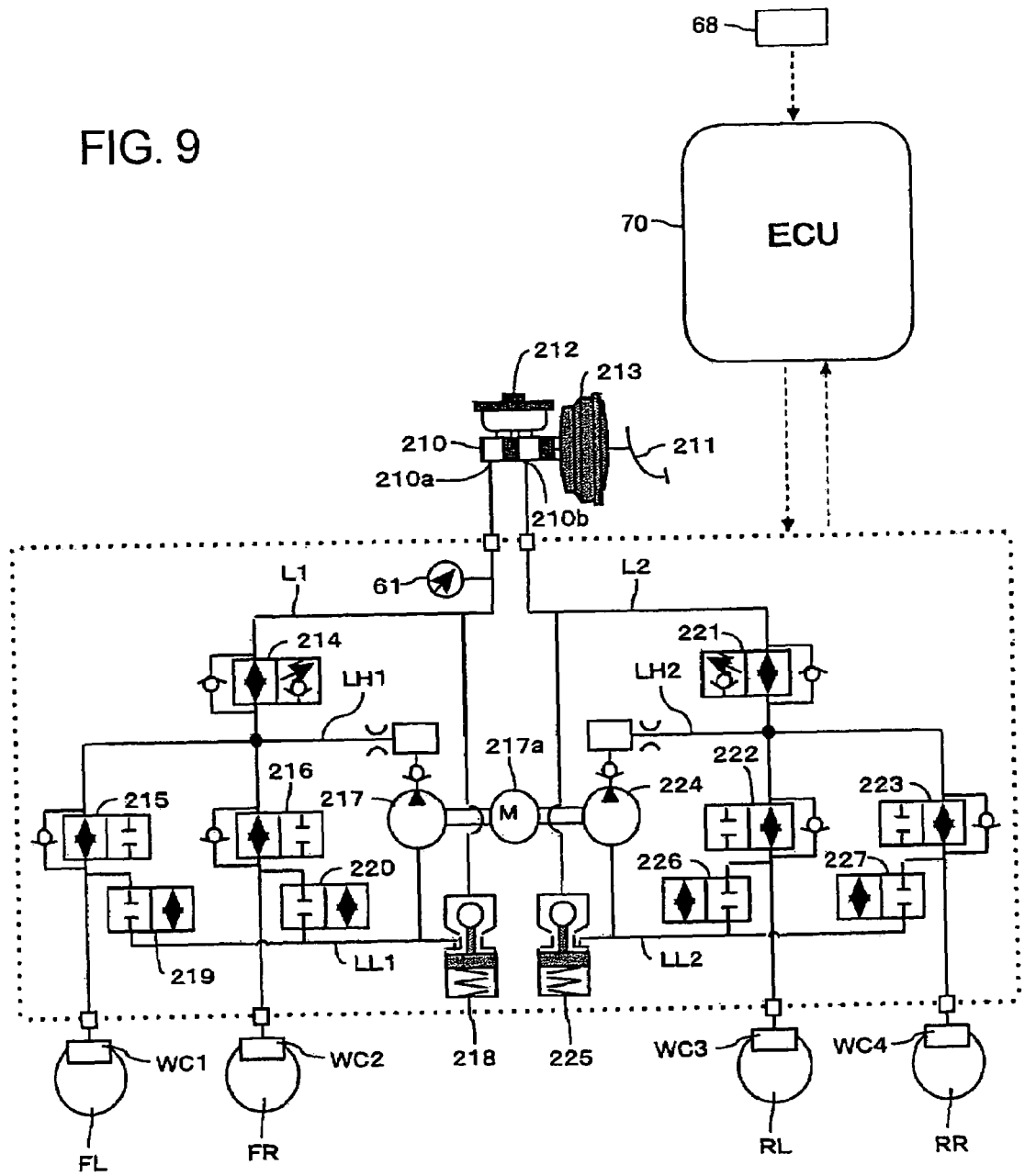
FIG. 9 is a schematic circuit diagram of a vehicle brake device in a third embodiment according to the present invention.

Hereinafter, a vehicle brake device in a third embodiment according to the present invention will be described with reference to FIG. 9. FIG. 9 is a fluid circuit diagram showing the schematic construction of the vehicle brake device A in this embodiment. The components in the third embodiment which are identical to those in the first embodiment are given the same reference numerals as used in the first embodiment and are omitted from being described in detail. Therefore, the following description is addressed to the respects which are different from those in the first embodiment.

The vehicle brake device A is of the type which is included in hydraulic vehicle brake device and has functions for securing the vehicle stability during acceleration and turn (e.g., VSC (Vehicle Stability Control) and TRC (Traction Control)). The vehicle brake device A is provided with a master cylinder 210 which generates brake oil of the fluid pressure corresponding to the stepping state of a brake pedal 211 to supply the brake oil to wheel cylinders WC1-WC4 for respectively restraining the rotations of wheels FL, FR, RL and RR, a reservoir tank 212 for storing the brake oil, and a vacuum booster 213 for assisting or boosting the stepping force on the brake pedal 211.

A first outlet port 210a of the master cylinder 210 communicates with a wheel cylinder WC1 for a front left wheel FL through a first oil line L1 and solenoid valves 214 and 215 when the solenoid valves 214 and 215 are in a de-energized state (the illustrated state) and also communicates with a wheel cylinder WC2 for a front right wheel FR through the first oil line L1 and solenoid valves 214 and 216 when the solenoid valves 214 and 216 are in a de-energized state (the illustrated state). The solenoid valve 214 is provided for making the first oil line L1 communicate with or blocked from the wheel cylinders WC1 and WC2 when energized or de-energized to change the state thereof and serves as master cylinder cutting means. The solenoid valves 215 and 216 are provided for making the first oil line L1 or a later-mentioned first high pressure oil line LH1 communicate with or blocked from the wheel cylinders WC1 and WC2 when energized or de-energized to change the states thereof.

The vehicle brake device A is provided with a pump 217 as fluid pressure supply source. The pump 217 is driven by an electric motor 217a. A suction port of the pump 217 is in communication with a built-in reservoir tank 218 containing brake oil, and the pump 217 draws and pressurizes the brake oil to discharge the same from a discharge port. The discharge port of the pump 217 communicates with the master cylinder 10 through the first high pressure oil line LH1, the solenoid valve 214 and the first oil line L1 when the solenoid valve 214 as master cylinder cutting means is in a de-energized state (the illustrated state) and also communicates with the wheel cylinders WC1 and WC2 through the first high pressure oil line LH1 and the solenoid valves 215 and 216 when the solenoid valves 215 and 216 as pressure increasing means are in the de-energized state (the illustrated state).

Branched from between the solenoid valves 215, 216 and the wheel cylinders WC1, WC2 is a first low pressure oil line LL1, which is connected to the built-in reservoir tank 218 through the solenoid valves 219 and 220 serving as pressure decreasing means. The solenoid valves 219 and 220 are provided for making the first low pressure oil line LL1 communicate with or blocked from the wheel cylinders WC1 and WC2 when energized or de-energized to change the states thereof.

A second outlet port 210b of the master cylinder 210 communicates with a wheel cylinder WC3 for a rear left wheel RL through a second oil line L2 and solenoid valves 221 and 222 when the solenoid valves 221 and 222 are in a de-energized state (the illustrated state) and also communicates with a wheel cylinder WC4 for a rear right wheel RR through the second oil line L2 and solenoid valves 221 and 223 when the solenoid valves 221 and 223 are in a de-energized state (the illustrated state). The solenoid valve 221 is provided for making the second oil line L2 communicate with or blocked from the wheel cylinders WC3 and WC4 when energized or de-energized to change the state thereof and serves as master cylinder cutting means. The solenoid valves 222 and 223 are provided for making the second oil line L2 or a later-mentioned second high pressure oil line LH2 communicate with or blocked from the wheel cylinders WC3 and WC4 when energized or de-energized to change the states thereof.

The vehicle brake device A is provided with another pump 224 as fluid pressure supply source. The pump 224 is driven by the electric motor 217a. A suction port of the pump 224 is in communication with another built-in reservoir tank 225 containing brake oil, and the pump 224 draws and pressurizes the brake oil to discharge the same from a discharge port. The discharge port of the pump 224 communicates with the master cylinder 10 through the second high pressure oil line LH2, the solenoid valve 221 and the second oil line L2 when the solenoid valve 221 as master cylinder cutting means is in a de-energized state (the illustrated state) and also communicates with the wheel cylinders WC3 and WC4 through the second high pressure oil line LH2 and the solenoid valves 222 and 223 when the solenoid valves 222 and 223 as pressure increasing means are in the de-energized state (the illustrated state).

Branched from between the solenoid valves 222, 223 and the wheel cylinders WC3, WC4 is a second low pressure oil line LL2, which is connected to the built-in reservoir tank 225 through the solenoid valves 226 and 227 serving as pressure decreasing means. The solenoid valves 226 and 227 are provided for making the second low pressure oil line LL2 communicate with or blocked from the wheel cylinders WC3 and WC4 when energized or de-energized to change the states thereof. In this embodiment, the solenoid valves 219, 220, 226 and 227 serving as pressure reducing means also serve as drain means.

Further, the vehicle brake device A is provided with a fluid pressure meter 61 for detecting the oil pressure of the first oil line L1. In addition, the vehicle brake device A is provided with an ECU (Electronic Control Unit) which have connected thereto the electric motor 217a, the solenoid valves 214-216, 219-223, 226 and 227, the fluid pressure meter 61 and a collision detection sensor 68. The ECU 70 executes an ordinary brake control, that is, brakes the vehicle in dependence on the stepping state of the brake pedal 211 by opening the master cylinder cutting means, and also executes a control for maintaining the stability in traveling of the vehicle by closing the master cylinder cutting means and by controlling the open/close operations of the pressure increasing means and the pressure reducing means irrespective of the stepping manipulation of the brake pedal 211.

Next, description will be made regarding the operation which the vehicle brake device A in the third embodiment as constructed above performs when a collision of the vehicle occurs. After detecting the collision of the vehicle by the collision detection means (collision detection sensor 68) and subsequently to a time point when detecting the pushing-up of the brake pedal 211 by the pedal pushing-up detection means in the same manner as in the foregoing first embodiment, the ECU 70 controls the open/close operation of at least one of the pressure reducing means 219 (220, 226 or 227) to adjust the draining of the brake oil from the master cylinder 1 0 to the built-in reservoir tank 218 or 225 and withdraws the brake pedal 211 as the stepping state of the brake pedal 211 (master cylinder pressure) detected by the stepping state detection means (fluid pressure meter 61) is maintained in the predetermined state (at the set value P2). As a consequence, where upon collision of the vehicle, the collision is of the degree that the brake pedal 211 is pushed up, the CPU 70 withdraws the brake pedal 211 with a suitable pedal reaction force being retained after the time point when the pushing-up of the brake pedal 211 is detected. Therefore, it can be realized to reliably secure an anchorage on which the driver's body balance is kept and to reliably prevent an excess force from being exerted on the driver.

In this third embodiment, the amount in withdrawal of the brake pedal 211 may be adjusted by adjusting the operation of the vacuum booster 213 in dependence on the urgency for the reaction force retention control. In this case, the vacuum booster 213 is constructed to be of the type as described in Japanese unexamined, published patent application No. 2001-088668, namely, to be a so-called "active brake booster". This booster is provided with a solenoid as actuator and is able to variably control its output power in proportion to a drive electric current (i) to the solenoid. More specifically, in the active brake booster, by operating (automatically operating) the solenoid (assist power adjusting means) independently of the brake stepping force, an assist force is generated in proportion to the drive electric current (i), whereby the output power can be obtained as that which is made by adding the assist force to the output power (pressuring force) depending on the brake stepping force (F) given by the driver. With this construction, the pedal withdrawal amount is adjusted by generating the assist force so that the oil quantity in the master cylinder 10 is decreased to withdraw the brake pedal 211, and in this manner, it can be realized to enhance the responsiveness in the reaction force retention control.

Fourth Embodiment

Figure 10:
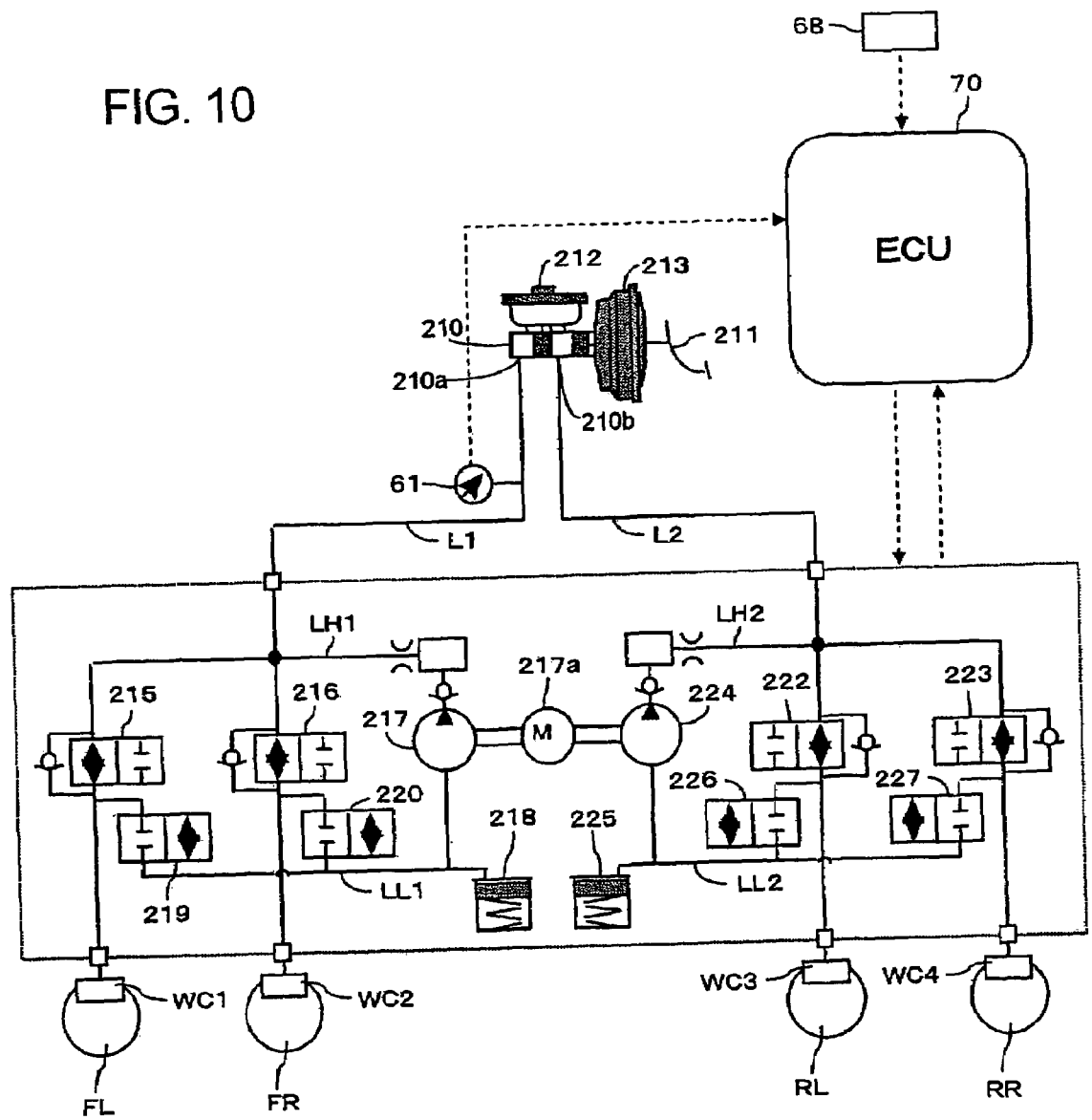
FIG. 10 is a schematic circuit diagram of a vehicle brake device in a fourth embodiment according to the present invention.

Hereinafter, a vehicle brake device in a fourth embodiment according to the present invention will be described with reference to FIG. 10. FIG. 10 is a fluid circuit diagram showing the schematic construction of the vehicle brake device A in this embodiment. The components in the fourth embodiment which are identical to those in the third embodiment are given the same reference numerals as used in the third embodiment and are omitted from being described in detail. Therefore, the following description is addressed to the respects which are different from those in the third embodiment.

The vehicle brake device A is of the type that is included in so-called "hydraulic vehicle brake devices" and that has an ABS (Anti-lock Brake System) function only. In this case, the general construction of this embodiment is made by removing the solenoid valves 214 and 221 from the foregoing third embodiment. Further, when the wheels are brought into lock states, the ECU 70 executes a control for braking the vehicle while avoiding the wheel locks by controlling the open/close operations of the pressure increasing means and the pressure reducing means.

Then, after detecting a collision of the vehicle by the collision detection means (collision detection sensor 68) and subsequently to a time point when detecting the pushing-up of the brake pedal 211 by the pedal pushing-up detection means in the same manner as in the foregoing first embodiment, the ECU 70 controls at least one of the pressure reducing means (the solenoid valves 219, 220, 226 and 227) serving as drain means to adjust the draining of the brake oil from the master cylinder 210 to the built-in reservoir tank 218 or 225 and withdraws the brake pedal 211 as the stepping state (master cylinder pressure) detected by the stepping state detection means (the fluid pressure meter 61) is maintained in the predetermined state (at the set value P2). As a consequence, where upon the collision of the vehicle, the collision is of the degree that the brake pedal 211 is pushed up, the CPU 70 withdraws the brake pedal 211 with a suitable pedal reaction force being maintained after the time point when the pushing-up of the brake pedal 211 is detected. Therefore, it can be realized to reliably secure an anchorage on which the driver's body balance is kept and to reliably prevent an excess force from being exerted on the driver.

Fifth Embodiment

Figure 11:
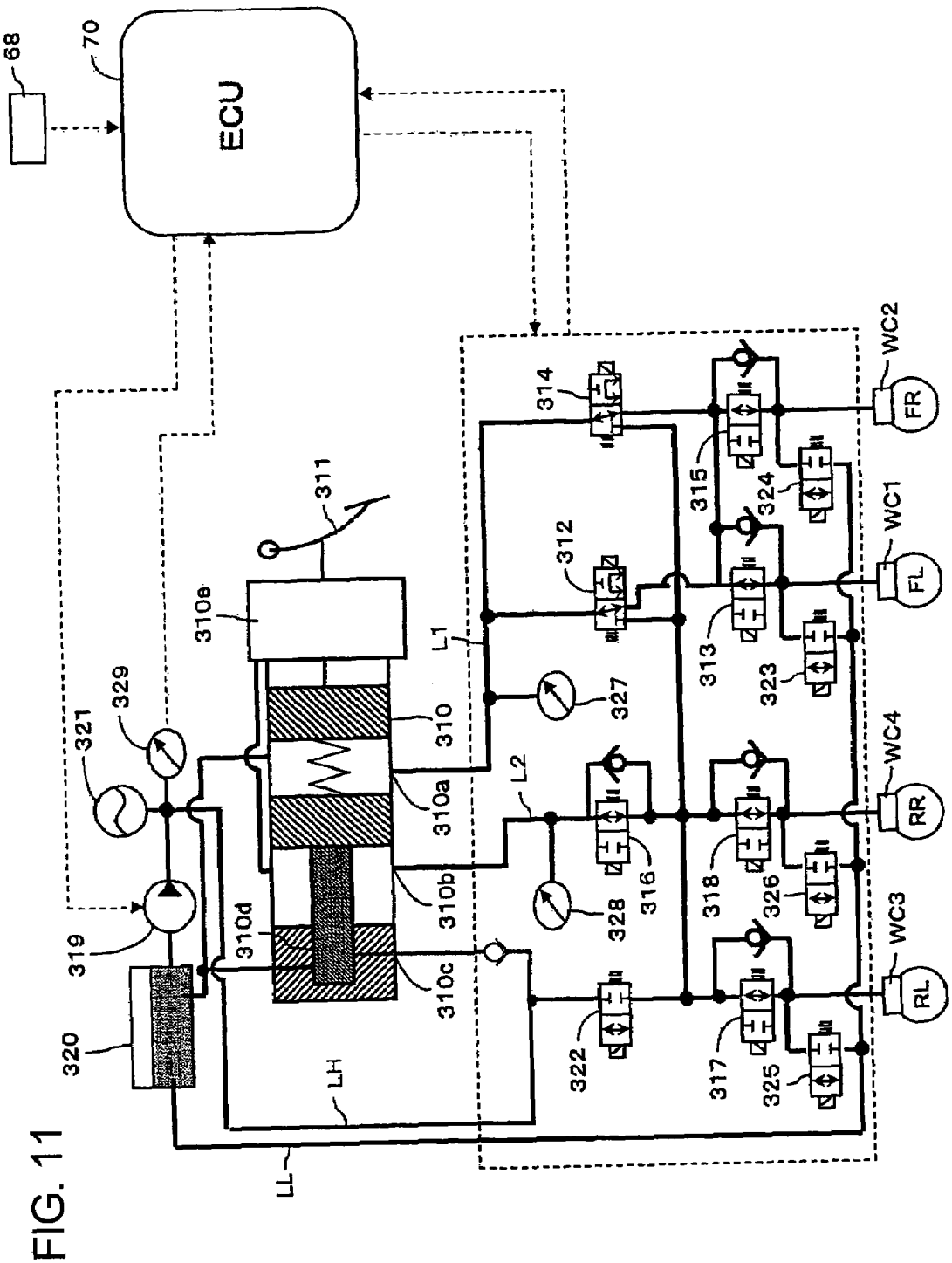
FIG. 11 is a schematic circuit diagram of a vehicle brake device in a fifth embodiment according to the present invention.

Hereinafter, a vehicle brake device in a fifth embodiment according to the present invention will be described with reference to FIG. 11. FIG. 11 is a fluid circuit diagram showing the schematic construction of the vehicle brake device A in this embodiment. The components in the fifth embodiment which are identical to those in the first embodiment are given the same reference numerals as used in the first embodiment and are omitted from being described in detail. Therefore, the following description is addressed to the respects which are different from those in the first embodiment.

The vehicle brake device A is of the type that is included in so-called "hydraulic vehicle brake devices" and that has a fluid booster for boosting brake oil in a master cylinder by means of fluid pressure. The vehicle brake device A is provided with a master cylinder 310 having a fluid pressure booster for pressurizing and supplying the brake oil from first and second outlets portions 310a, 310b in dependence on the stepping manipulation of a brake pedal 311. A first outlet port 310a of the master cylinder 310 communicates with a wheel cylinder WC1 for a front left wheel FL through a first oil line L1 and solenoid valves 312 and 313 when the solenoid valves 312 and 313 are in a de-energized state (the illustrated state) and also communicates with a wheel cylinder WC2 for a front right wheel FR through the first oil line L1 and solenoid valves 314 and 315 when the solenoid valves 314 and 315 are in a de-energized state (the illustrated state). The solenoid valves 312 and 314 are provided for switching the oil line which is to communicate with the wheel cylinders WC1 and WC2, between the first oil line L1 and a later-mentioned high pressure oil line LH when energized or de-energized to change over their states. The solenoid valves 313 and 315 are provided for making the first oil line L1 or the high pressure oil line LH communicate with or blocked from the wheel cylinders WC1 and WC2 when energized or de-energized to change over their states.

A second outlet port 310b of the master cylinder 310 communicates with a wheel cylinder WC3 for a rear left wheel RL through a second oil line L2 and solenoid valves 316 and 317 when the solenoid valves 316 and 317 are in a de-energized state (the illustrated state) and also communicates with a wheel cylinder WC4 for a rear right wheel RR through the second oil line L2 and solenoid valves 316 and 318 when the solenoid valves 316 and 318 are in a de-energized state (the illustrated state). The solenoid valve 316 is provided for making the second oil line L2 communicate with or blocked from the wheel cylinders WC3 and WC4 when energized or de-energized to change the state thereof. The solenoid valves 317 and 318 are provided for making the second oil line L2 or the high pressure oil line LH communicate with or blocked from the wheel cylinders WC3 and WC4 when energized or de-energized to change the states thereof.

Further, the vehicle brake device A is provided with a pump 319. The pump 319 draws brake oil in a reservoir tank 320 to pressure and feed the brake oil to an accumulator 321 and maintains the oil pressure in the accumulator 321 serving as fluid pressure supply source always at a constant pressure. The accumulator 321 is connected to a solenoid valve 322 through the high pressure oil line LH. A solenoid valve 322 operates to block the high pressure oil line LH when in a de-energized state (the illustrated state) and brings the high pressure oil line LH into communication with the solenoid valves 312, 314, 317 and 318. The accumulator 321 communicates with the wheel cylinder WC1 for the front left wheel FL through the high pressure oil line LH and the solenoid valves 322, 312 and 313 when the solenoid valves 322 and 312 are turned into the energized state and when the solenoid valve 313 remains in the de-energized state and also communicates with the wheel cylinder WC2 for the front right wheel FR through the high pressure oil line LH and the solenoid valves 322, 314 and 315 when the solenoid valves 322 and 314 are turned into the energized state and when the solenoid valve 315 remains in the de-energized state. Also, the accumulator 321 communicates with the wheel cylinder WC3 for the rear left wheel RL through the high pressure oil line LH and the solenoid valves 322 and 317 when the solenoid valves 322 is turned into the energized state and when the solenoid valve 317 remains in the de-energized state and also communicates with the wheel cylinder WC4 for the rear right wheel RR through the high pressure oil line LH and the solenoid valves 322 and 318 when the solenoid valves 322 is turned into the energized state and when the solenoid valve 318 remains in the de-energized state.

Further, the accumulator 321 is in communication with another inlet port 310c of the master cylinder 310 through the high pressure oil line LH. High pressure brake oil lead from the inlet port 310c is discharged from the second outlet portion 310b by way of a regulator 310d built in the master cylinder 310 and further by way of a booster chamber 310e. The stepping force on the brake pedal 311 is assisted when the pressure is lead into the booster chamber 310e.

Branched from between the solenoid valves 313, 315, 317, 318 and the wheel cylinders WC1-WC4 is a low pressure oil line LL, which is connected to the reservoir tank 320 through the solenoid valves 323-326. The solenoid valves 323-326 are provided for making the low pressure oil line LL communicate with or blocked from the wheel cylinders WC1-WC4 when energized or de-energized to change the states thereof.

Further, the vehicle brake device A is provided with fluid pressure meters 327, 328 and 329 for respectively detecting oil pressures on the first oil line L1, the second oil line L2 and the high pressure oil line LH. In this embodiment, the solenoid valves 313, 315, 317 and 318 constitute pressure increasing means, the solenoid valves 323-326 constitute pressure reducing means, the solenoid valves 312 and 314 constitute switching means, the solenoid valve 322 constitutes high pressure shutoff means, and the solenoid valve 316 constitutes rear wheel switching means. The switching means, the rear wheel switching means and the high pressure shutoff means are provided between the pressure increasing means and the pressure reducing means and the master cylinder 310 and operates to switch a state that makes the wheel cylinders WC1-WC4 communicate with the master cylinder 310 and blocked from the accumulator 321, to another state that makes the wheel cylinders WC1-WC4 blocked from the master cylinder 310 and communicate with the accumulator 321. In this embodiment, the solenoid valves 323-324 constituting the pressure reducing means also serve as drain means.

In addition, the vehicle brake device A is provided with an ECU (Electronic Control Unit) 70 having connected thereto an electric motor (not shown) for driving the aforementioned pump 319, the solenoid valves 312-318 and 322-326, the fluid pressure meters 327-329 and a collision detection sensor 68. The ECU 70 brakes the vehicle in dependence on the stepping manipulation of the brake pedal 311 and executes a control for maintaining the stability in traveling of the vehicle by controlling the open/close operations of the high pressure shutoff means, the switching means, the rear wheel switching means, the pressure increasing means and the pressure reducing means irrespective of the stepping manipulation of the brake pedal 311. In this embodiment, the fluid pressure meter 327 serves as means for detecting the master cylinder pressure as the stepping state of the brake pedal 311 (stepping state detection means).

Next, description will be made regarding the operation which the vehicle brake device A in the fifth embodiment as constructed above performs when a collision of the vehicle occurs. In the same manner as in the foregoing first embodiment, the ECU 70 detects the collision of the vehicle by the collision detection means (the collision detection sensor 68) and also detects the pushing-up of the brake pedal 311 by the pedal pushing-up detection means. Then, from a time point when the collision of the vehicle occurs to another time point when the pushing-up of the brake pedal 311 is detected, the ECU 70 closes the pressure reducing means (the solenoid valves 323 and 324) to restrain the draining of the brake oil from the master cylinder 310, and subsequently to the time point when the pushing-up of the brake pedal 311 is detected, the ECU 70 controls the open/close operation of at least one of the pressure reducing means (the solenoid valves 323 and 324) to adjust the draining of the brake oil from the master cylinder 310 to the reservoir tank 320. Thus, the ECU 70 is able to withdraw the brake pedal 311 as the stepping state of the brake pedal 311 detected by the stepping state detection means (the fluid pressure meter 327) is maintained in a predetermined state (at the set value P2). Thus, where upon the collision of the vehicle, the collision is of the degree that the brake pedal 311 is not pushed up, the CPU 70 keeps the reaction force exerted on the brake pedal 311 upon the collision without withdrawing the brake pedal 311. Further, the where the collision is of the degree that the brake pedal 311 is pushed up, the CPU 70 withdraws the brake pedal 311 while keeping a suitable reaction force after the time point when the pushing-up of the brake pedal 311 is detected. Therefore, it can be realized to reliably secure an anchorage on which the driver's body balance is kept and to reliably prevent an excess force from being exerted on the driver.

Although in the foregoing fifth embodiment, construction is taken to make the first oil line L1 communicate with the brake system for the front wheels and the second oil line L2 communicate with the brake system for the rear wheels, the communication relation may be reversed to make the first oil line L1 communicate with the brake system for the rear wheels and the second oil line L2 communicate with the brake system for the front wheels.

Further, in the fifth embodiment, the master cylinder 310 is constructed to supply the brake oil to either the front wheel cylinders or the rear wheel cylinders and also to supply to the remaining wheel cylinders the brake oil which has been used in boosting the fluid pressure in the master cylinder 310 after being supplied from the fluid pressure supply source 321 to the master cylinder 310. However, the construction may be modified to use the brake oil supplied from the fluid pressure supply source 321 only for the purpose of boosting the fluid pressure in the master cylinder 310 and to make the master cylinder 310 supply the pressurized fluid so boosted to the front wheel cylinders and the rear wheel cylinders.

This can be realized by taking the combination of a master cylinder and a booster in the form that the vacuum booster in the foregoing third or fourth embodiment is replaced by a hydraulic booster. In this connection, the first oil line L1 for the front wheels WC1 and WC2 is connected to the first outlet port 310a of the master cylinder 310, the second oil line L2 for the rear wheels WC3 and WC4 is connected to the second outlet port 310b of the master cylinder 310, and the high pressure oil line LH is connected to operate the hydraulic booster replacing the vacuum booster 310e. With this modified construction, even in the hydraulic booster type that the brake oil in the master cylinder 310 is pressurized by means of hydraulic pressure, of so-called "hydraulic vehicle brake devices", the brake pedal 311 can be withdrawn with a suitable pedal reaction force being maintained after the time point when the pushing-up of the brake pedal 311 is detected where upon the collision of the vehicle, the collision is of the type that the brake pedal 311 is pushed up. Therefore, it can be realized to reliably secure an anchorage on which the driver's body balance is kept and to reliably prevent an excess force from being exerted on the driver.

In each of the foregoing embodiments, where the ECU 70 cannot maintain the stepping state of the brake pedal 11 (211 or 311) in the predetermined state due to an decrease in the brake oil quantity in the master cylinder 10 (210 or 310), the ECU 70 may replenish the brake oil from the fluid pressure supply source 20 (217, 224 or 321) to the master cylinder 10 (210 or 310) so that the brake pedal 11 (211 or 311) can be withdrawn with the stepping state of the brake pedal 11 (211 or 311) being maintained in the predetermined state. By doing so, it can be realized to withdraw the brake pedal 11 (211 or 311) with the same being kept more reliably in the predetermined state.

Furthermore, in each of the foregoing embodiments, in draining the brake oil from the master cylinder 10 (210 or 310) to the reservoir tank 12 (218, 225 or 320), the ECU 70 may select the drain means of the number depending on the draining quantity and may control the open/close operations of the drain means of the selected number. By doing so, it can be realized to withdraw the brake pedal 11 (211 or 311) with the same being kept more reliably in the predetermined state.

Sixth Embodiment

Figure 12:
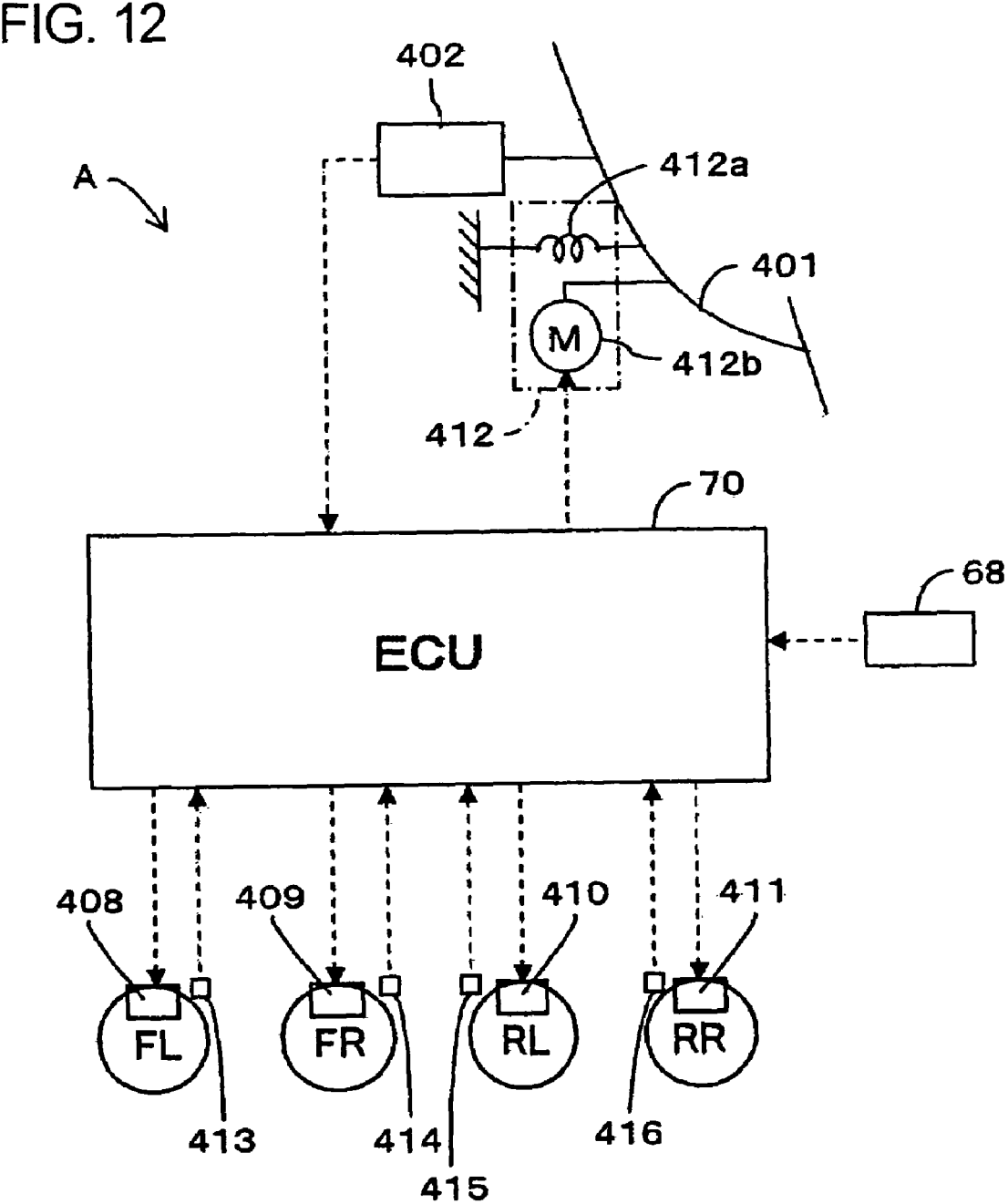
FIG. 12 is a schematic circuit diagram of a vehicle brake device in a sixth embodiment according to the present invention.

Hereinafter, a vehicle brake device in a sixth embodiment according to the present invention will be described with reference to FIG. 12. FIG. 12 is a fluid circuit diagram showing the schematic construction of the vehicle brake device A in this embodiment. The components in the sixth embodiment which are identical to those in the first embodiment are given the same reference numerals as used in the first embodiment and are omitted from being described in detail. Therefore, the following description is addressed to the respects which are different from those in the first embodiment.

The vehicle brake device A is a so-called "electric type vehicle brake device" as described in Japanese unexamined, published patent application No. 2002-104153. The vehicle brake device A is provided with a brake pedal 401 manipulated by the driver, a stepping force sensor 402 for detecting a pedal stepping force as the stepping state of the brake pedal 401, an ECU (Electronic Control Unit) 70 having input thereto a detection signal from the stepping force sensor 402, and brake force generating sections 408-411 respectively provided for wheels FL, FR, RL and RR and drivable by the ECU 70 for generating brake forces to the wheels FL, FR, RL and RR. Each of the brake force generating sections 408-411 is composed of, e.g., an electric motor and a disc brake or a drum brake driven by the electric motor and is able to adjust the brake force by adjusting the electric current to the electric motor.

With this construction, when the brake pedal 401 is stepped on by the driver, the stepping force is detected by the stepping force sensor 402, and the ECU 70 is operated to perform a brake control depending on the stepping force. Thus, the brake force generating sections 408-411 are controlled to generate the brake forces in dependence on the operation result of the ECU 70, so that the brake control is performed in dependence on the stepping manipulation of the brake pedal 401.

Further, the vehicle brake device A is provided with a reaction force actuator (reaction force adjusting means) 412 for applying a pedal reaction force to the brake pedal 401 in dependence on the operation result of the ECU 70, that is, for adjusting the reaction force against the stepping on the brake pedal 401. The reaction force actuator 412 is composed of a spring 412a applying to the brake pedal 401 a force directed in a direction opposite to the stepping direction (i.e., pedal reaction force) and an electric motor 412b driven by the ECU 70. With this construction, the pedal reaction force given by the spring 412a is adjusted by the motor 412b to make the pedal reaction force variable.

In addition, the vehicle brake device A is provided with wheel speed sensors 413-416 respectively for detecting wheel speeds of the wheels FL, FR, RL and RR. These wheel speed sensors 413-416 are connected to input their detection signals to the ECU 70. The ECU 70 is programmed or constructed to execute various operation processing based on the detection signals, to judge whether or not the wheels tend to be locked, that is, whether or not an ABS control is to be performed, and to control outputs of the brake force generating sections 408-411 and the output of the electric motor 412b constituting the reaction force actuator 412 by generating output signals corresponding to a control state to be brought about.

Next, description will be made regarding the operation which the vehicle brake device A in the sixth embodiment as constructed above performs when a collision of the vehicle occurs. In the same manner as in the foregoing first embodiment, the ECU 70 detects the collision of the vehicle by the collision detection means (the collision detection sensor 68) and also detects the pushing-up of the brake pedal 401 by the pedal pushing-up detection means. Then, when the pushing-up of the brake pedal 401 is detected by the pedal pushing-up detection means, the ECU 70 withdraws the brake pedal 401 by controlling the reaction force adjusting means. Thus, where the collision of the vehicle is of the degree that the brake pedal 401 is not pushed up, the CPU 70 does not withdraw the brake pedal 401. On the other hand, where the collision of the vehicle is of the degree that the brake pedal 401 is pushed up, the CPU 70 does not withdraw the brake pedal 401 until the pushing-up of the brake pedal 401 is detected after the collision of the vehicle and then withdraws the brake pedal 401 upon detection of the pushing-up. Therefore, the brake pedal 401 is withdrawn timely or at an appropriate time, so that it can be realized to reliably secure an anchorage on which the driver's body balance is kept and to reliably prevent an excess force from being exerted on the driver.

Further, the ECU 70 controls the reaction force adjusting means to withdraw the brake pedal 401 as the stepping force of the brake pedal detected by the stepping state detection means is kept at the predetermined value P2. Thus, since even after the brake pedal 401 begins to be pushed up, the brake pedal 401 is withdrawn with the retention of a suitable pedal reaction force without being withdrawn abruptly, it can be realized to reliably secure an anchorage on which the driver's body balance is kept and to reliably prevent an excess force from being exerted on the driver.

Since the pedal pushing-up detection means detects the pushing-up of the brake pedal 401 based on the pedal stepping force detected by the stepping state detection means, it can detect the pushing-up of the brake pedal accurately and reliably.

Figure 2:
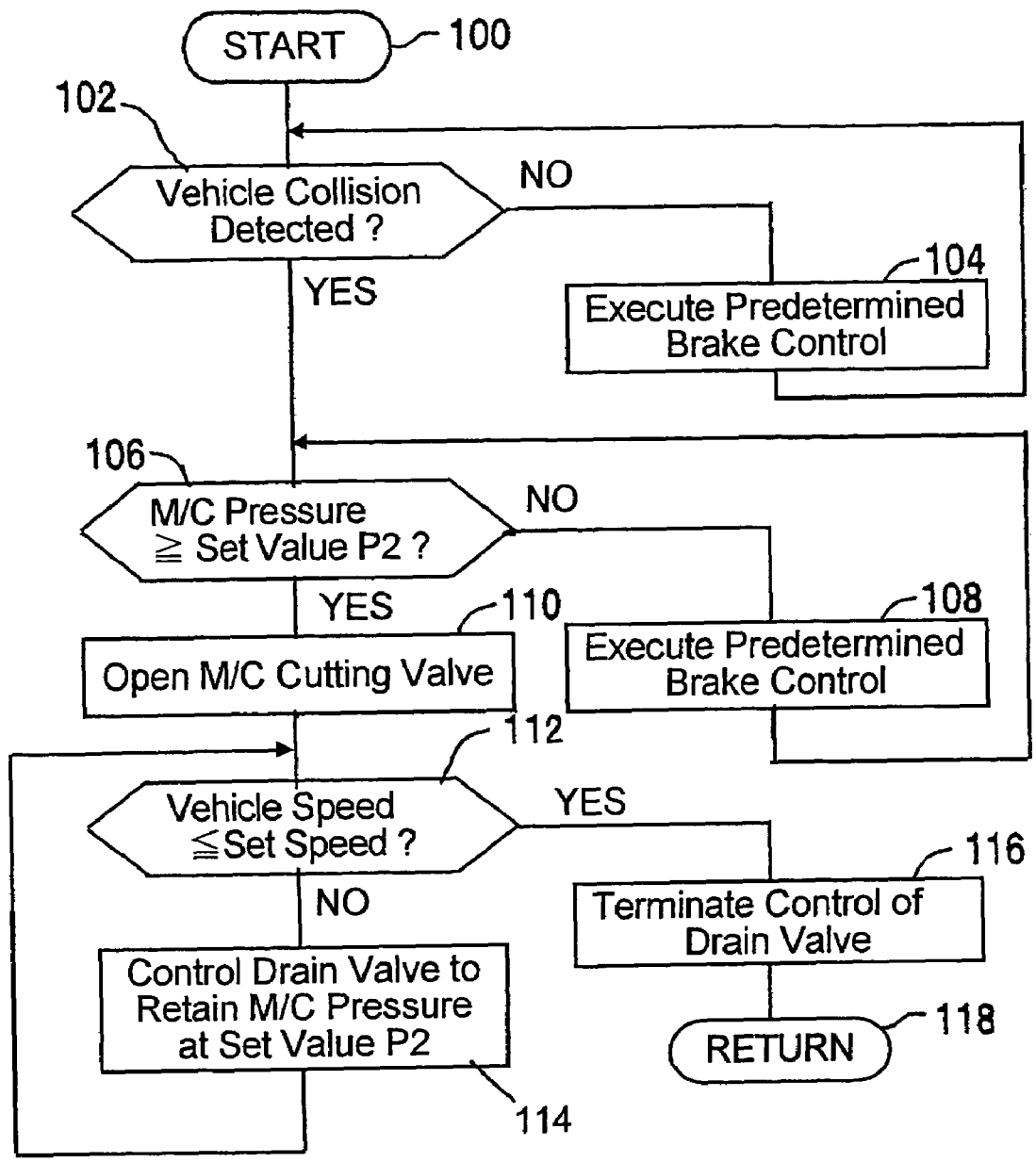
FIG. 2 is a flow chart of a control program executed by an ECU shown in FIG. 1.

Various features and many of the attendant advantages in the foregoing embodiments will be summarized as follows:

In the vehicle brake device A in the foregoing first embodiment typically shown in FIGS. 1 and 2, upon collision of the vehicle, the pedal control means 70 withdraws the brake pedal 11 for the first time after the pushing-up of the brake pedal 11 is detected by the pedal pushing-up detection means (step 106). Thus, where the collision is of the degree that the brake pedal 11 is not pushed up, the brake pedal 11 is not withdrawn. Where the collision is of the degree that the brake pedal 11 is pushed up, on the contrary, the brake pedal 11 is not withdrawn during the time period from the collision of the vehicle to the detection of the brake pedal pushing-up, and then, is withdrawn upon detection of the pushing-up. Therefore, the brake pedal 11 can be withdrawn timely, i.e., at an appropriate time, and it can be realized to reliably secure an anchorage on which the driver's body balance is kept and to reliably prevent an excess force from being exerted on the driver.

Also in the vehicle brake device A in the foregoing first embodiment typically shown in FIGS. 1 and 2, the pedal pushing-up detection means (step 106) detects the pushing-up of the brake pedal 11 based on the stepping state (e.g., pedal stepping force, or fluid pressure in the master cylinder 10) which is detected by the stepping state detection means (e.g., the fluid pressure meters 61 and 62) for detecting the stepping state of the brake pedal 11, and thus, it can be realized to detect the pushing-up of the brake pedal 11 accurately and reliably.

Also in the vehicle brake device A in the foregoing first embodiment typically shown in FIGS. 1 and 2, the pedal control means 70 operates to withdraw the brake pedal 11 as the stepping state (e.g., pedal stepping force, or fluid pressure in the master cylinder 10) of the brake pedal 11 detected by the stepping state detection means (e.g., the fluid pressure meters 61 and 62) is maintained in the predetermined state P2. Thus, the brake pedal 11 is not withdrawn abruptly at the same time as the pushing-up of the brake pedal 11 begins, but is withdrawn with the retention of a suitable pedal reaction force. Therefore, it can be realized to reliably secure an anchorage on which the driver's body balance is kept and to reliably prevent an excess force from being exerted on the driver.

Also in the vehicle brake device A in the foregoing first embodiment typically shown in FIGS. 1 and 2, since the predetermined state (the set value P2) is set to the state in which there is generated a pedal reaction force necessary to keep the body balance of the driver and in which an excessive force is not being exerted on the driver's foot, it can be realized to reliably secure an anchorage on which the driver's body balance is kept and to reliably prevent an excess force from being exerted on the driver.

Also in the vehicle brake device A in the foregoing first embodiment typically shown in FIGS. 1, 2, 4 and 5, the pedal pushing-up detection means (step 106) detects the pushing-up of the brake pedal 11 in dependence on the urgency which is judged by urgency judgment means (105*a* or 205*a*). Thus, where the urgency for the control is great, the pushing-up of the brake pedal 11 can be detected earlier, so that the control operation of the pedal control means 70 can be initiated earlier.

Also in the vehicle brake device A in the foregoing first embodiment typically shown in FIGS. 1 and 2, the vehicle brake device A is constructed as being of the hydraulic type and is provided with the drain means (the solenoid valves 46 and 48) for adjustably draining the brake oil from the outlet ports 10*a*, 10*b* of the master cylinder 10 to the reservoir tank 12. When the pushing-up of the brake pedal 11 is detected by the pushing-up detection means (step 106), the pedal control means 70 withdraws the brake pedal 11 by controlling the drain means (the solenoid valves 46 and 48) to adjust the draining of the brake oil. Thus, where the collision is of the degree that the brake pedal 11 is not pushed up, the brake pedal 11 is not withdrawn. Where the collision is of the degree that the brake pedal 11 is pushed up, on the contrary, the brake pedal 11 is not withdrawn during the time period from the collision of the vehicle to the detection of the brake pedal pushing-up, and then, is withdrawn upon detection of the pushing-up. Therefore, the brake pedal 11 can be withdrawn timely, and it can be realized to reliably secure an anchorage on which the driver's body balance is kept and to reliably prevent an excess force from being exerted on the driver.

Also in the vehicle brake device A in the foregoing first embodiment typically shown in FIGS. 1 and 2, the drain means (the solenoid valves 46 and 48) are provided for the outlet ports 10*a*, 10*b* of the master cylinder 10, and the pedal control means 70 make the respective drain means (the solenoid valves 46 and 48) perform the same operations as each other. Thus, it can be realized to withdraw the brake pedal 11 with the same being maintained in the predetermined state P2 accurately and reliably.

Also in the vehicle brake device A in the foregoing first embodiment typically shown in FIGS. 1 and 2, the vehicle brake device A is constructed as being of a so-called "brake-by-wire type" included in hydraulic vehicle brake devices and is provided with the stroke simulator 30 of a mechanical type. Where upon collision of the vehicle, the collision is of the degree that the brake pedal 11 is not pushed up, the reaction force of the brake pedal 11 is maintained as was at the occurrence of the collision without withdrawing the brake pedal 11. Where the collision is of the degree that the brake pedal 11 is pushed up, on the contrary, the brake pedal 11 is not withdrawn during the time period from the collision of the vehicle to the detection of the brake pedal pushing-up, and the reaction force of the brake pedal 11 during the same time period is maintained as was at the occurrence of the collision. After the time point when the pushing-up of the brake pedal 11 is detected, the brake pedal 11 is withdrawn with the retention of a suitable pedal reaction force. Therefore, it can be realized to reliably secure an anchorage on which the driver's body balance is kept and to reliably prevent an excess force from being exerted on the driver.

Also in the vehicle brake device A in the foregoing first embodiment typically shown in FIGS. 1, 2 and 6, the stroke simulator 100 provides a predetermined pedal manipulation force to pedal stroke property by means of the urging force of the main resilient member 110 when the pedal manipulation force is lower the predetermined load F3 and also provides another pedal manipulation force to pedal stroke property, which is different from the predetermined pedal manipulation force to pedal stroke property and in which the stroke length increases with increases in the manipulation force, by means of the urging force of the sub-resilient member 120 when the pedal manipulation force is equal to or greater than the predetermined load F3. Thus, when the operation of the master cylinder cutting means (the solenoid valve 41 or 42) is delayed somewhat, the master cylinder pressure corresponding to the pedal manipulation force is heightened extraordinarily. Since the pedal stroke is increased in this case, it can be realized to withdraw the brake pedal 11 with retention of the driver's body balance.

Also in the vehicle brake device A in the foregoing first embodiment typically shown in FIGS. 1, 2 and 6, the pedal manipulation force to pedal stroke property of the stroke simulator 100 has the ordinary property in which the pedal stroke increases with increases in the pedal manipulation force to come to be stable thereafter and the withdrawal property in which the pedal stroke increases again when the pedal manipulation force becomes equal to or greater than the predetermined load F3 after the property comes to be stable. Thus, when the operation of the master cylinder cutting means (the solenoid valve 41 or 42) is delayed somewhat, the master cylinder pressure corresponding to the pedal manipulation force is heightened extraordinarily. Since the pedal stroke is increased in this case, it can be realized to withdraw the brake pedal 11 with retention of the driver's body balance.

In the vehicle brake device A in the foregoing second embodiment typically shown in FIG. 8, the vehicle brake device A is constructed as being of a so-called "brake-by-wire type" included in hydraulic vehicle brake devices and in particular, as having the solenoid valve 55 controllable to be open or closed instead of a mechanical type simulator. Where upon collision of the vehicle, the collision is of the degree that the brake pedal 11 is not pushed up, the brake pedal 11 is controlled to remain at a stepping position corresponding to the brake manipulation without being withdrawn. Where the collision is of the degree that the brake pedal 11 is pushed up, on the contrary, the brake pedal 11 is controlled to remain at a stepping position corresponding to the brake manipulation without being withdrawn during the time period from the collision of the vehicle to the detection of the brake pedal pushing-up, and after the time point when the pushing-up of the brake pedal 11 is detected, the brake pedal 11 is withdrawn with retention of a suitable pedal reaction force. Therefore, it can be realized to reliably secure an anchorage on which the driver's body balance is kept and to reliably prevent an excess force from being exerted on the driver.

In the vehicle brake device A in the foregoing third embodiment typically shown in FIG. 9, the vehicle brake device A is constructed as being of the hydraulic type and in particular, as having functions for securing the vehicle stability at the vehicle starting and during acceleration and turn (e.g., VSC (Vehicle Stability Control) and TRC (Traction Control)). Where upon collision of the vehicle, the collision is of the degree that the brake pedal 11 is pushed up, the brake pedal 11 is withdrawn with retention of a suitable pedal reaction force after the time point when the pushing-up of the brake pedal 11 is detected. Therefore, it can be realized to reliably secure an anchorage on which the driver's body balance is kept and to reliably prevent an excess force from being exerted on the driver.

In the modified form of the vehicle brake device A in the foregoing third embodiment typically shown in FIG. 9, the vehicle brake device A is constructed as being of the hydraulic type and in particular, as having a hydraulic booster 213 for boosting the brake oil in the master cylinder 210 by means of hydraulic pressure. Where upon collision of the vehicle, the collision is of the degree that the brake pedal 11 is pushed up, the brake pedal 11 is withdrawn with retention of a suitable pedal reaction force after the time point when the pushing-up of the brake pedal 11 is detected. Therefore, it can be realized to reliably secure an anchorage on which the driver's body balance is kept and to reliably prevent an excess force from being exerted on the driver.

In the vehicle brake device A in the foregoing fourth embodiment typically shown in FIG. 10, the vehicle brake device A is constructed as being of the hydraulic type and in particular, as having an ABS (Anti-lock Brake System) function. Where upon collision of the vehicle, the collision is of the degree that the brake pedal 11 is pushed up, the brake pedal 11 is withdrawn with retention of a suitable pedal reaction force after the time point when the pushing-up of the brake pedal 11 is detected. Therefore, it can be realized to reliably secure an anchorage on which the driver's body balance is kept and to reliably prevent an excess force from being exerted on the driver.

In the vehicle brake device A in each of the foregoing first to fifth embodiments typically shown in FIGS. 1, 8, 9, 10 and 11, where the pedal control means 70 cannot maintain the stepping state of the brake pedal 11 (211 or 311) in the predetermined state due to a decrease in the brake oil quantity in the master cylinder 10 (210 or 310), the pedal control means 70 replenishes the brake oil from the fluid pressure supply source 20 (217, 224 or 321) to the master cylinder 10 (210 or 310) so that the brake pedal 11 (211 or 311) can be withdrawn with the stepping state of the brake pedal 11 (211 or 311) being maintained in the predetermined state. Thus, it can be realized to withdraw the brake pedal 11 (211 or 311) with the same being kept more reliably in the predetermined state.

In the vehicle brake device A in each of the foregoing first to fifth embodiments typically shown in FIGS. 1, 8, 9, 10 and 11, the master cylinder 10 (210 or 310) has two outlet ports 10*a*, 10*b* (210*a*, 210*b* or 310*a*, 310*b*) communicating with the wheel, cylinders WC1-WC4, and the pressurized fluid systems L1, L2 including the outlet ports 10*a*, 10*b* (210*a*, 210*b* or 310*a*, 310*b*) are controllable independently of each other. After the time point when the collision detection means (collision detection sensor 68) detects the collision of the vehicle, one of the pressurized fluid systems (e.g., L1) is controlled to retain or increase the fluid pressure in the wheel cylinders WC1-WC2 by bringing the wheel cylinder WC1-WC2 into blocking from the master cylinder 10 (210 or 310) and into communication with the pressurized fluid supply source 20 (217 or 321). Therefore, it can be realized to execute the aforementioned withdrawal control for the brake pedal 11 (211 or 311) by the use of one pressurized fluid system (e.g., L1) with the brake force on the wheels WC3-WC4 being maintained by the use of the other pressurized fluid system (e.g., L2).

In the vehicle brake device A in the foregoing sixth embodiment shown in FIGS. 12, the vehicle brake device A is constructed as being of the electric type. When the pushing-up of the brake pedal 401 is detected by the pedal pushing-up detection means (step 106 in FIG. 2), the pedal control means (ECU 70) controls the reaction force adjusting means (reaction force actuator 412) to withdraw the brake pedal 401. Thus, where the collision is of the degree that the brake pedal 401 is not pushed up, the brake pedal 401 is not withdrawn. Where the collision is of the degree that the brake pedal 401 is pushed up, on the contrary, the brake pedal 401 is not withdrawn during the time period from the collision of the vehicle to the detection of the pushing-up of the brake pedal 401 and then, is withdrawn upon detection of the pushing-up. Therefore, the brake pedal 401 can be withdrawn timely, and it can be realized to reliably secure an anchorage on which the driver's body balance is kept and to reliably prevent an excess force from being exerted on the driver.

Obviously, further numerous modifications and variations of the present invention are possible in light of the above teachings. It is therefore to be understood that within the scope of the appended claims, the present invention may be practiced otherwise than as specifically described herein.

What is claimed is:

1. A vehicle brake device for braking a vehicle by the stepping manipulation of a brake pedal, comprising:
   collision detection means for detecting a collision of the vehicle;
   pedal pushing-up detection means for detecting, after occurrence of the collision of the vehicle detected by the collision detection means, actual pushing-up of the brake pedal which is being stepped on by the driver;
   pedal control means for withdrawing the brake pedal when the pushing-up of the brake pedal is detected by the pedal pushing-up detection means; and
   stepping state detection means for detecting the stepping state of the brake pedal; wherein
   the pedal pushing-up detection means detects the pushing-up of the brake pedal when the change from a first stepping state to a second stepping state is detected by the stepping state detection means after the collision of the vehicle is detected by the collision detection means;
   the pedal control means withdraws the brake pedal as the stepping state of the brake pedal detected by the stepping state detection means is maintained in the second stepping state which has caused the pedal pushing-up detection means to detect the pushing-up of the brake pedal; and
   the second stepping state is a state that a pedal reaction force necessary to keep the body balance of the driver is being generated and that an excess force is not being exerted on the driver's foot.

2. The vehicle brake device as set forth in claim 1, further comprising urgency judgment means for judging urgency for the processing to be executed by the pedal control means, based on the state of the vehicle, and wherein:
   the pedal pushing-up detection means alters criterion for detecting the pushing-up of the brake pedal from the second stepping state to an altered second stepping state in dependence on the urgency judged by the urgency judgment means and detects the pushing-up of the brake pedal when the altered second stepping state is brought about.

3. The vehicle brake device as set forth in claim 1, further comprising:
   a master cylinder for generating brake oil of the fluid pressure depending on the stepping state of the brake pedal;
   a reservoir tank for storing brake oil; and
   drain means for adjustably draining the brake oil from an outlet port of the master cylinder to the reservoir tank, and wherein:
   when the pushing-up of the brake pedal is detected by the pedal pushing-up detection means, the pedal control means controls the drain means to adjust the draining of the brake oil from the master cylinder to the reservoir tank so that the brake pedal is withdrawn to hold a stepping state which has arisen when the pushing-up of the brake pedal is detected.

4. The vehicle brake device as set forth in claim 3, wherein the drain means is provided for each of outlet ports of the master cylinder, and wherein the pedal control means makes the respective drain means perform the same operations in draining the brake oil from the master cylinder to the reservoir tank.

5. A vehicle brake device for braking a vehicle by the stepping manipulation of a brake pedal, comprising:
   collision detection means for detecting a collision of the vehicle;
   pedal pushing-up detection means for detecting, after occurrence of the collision of the vehicle detected by the collision detection means, actual pushing-up of the brake pedal which is being stepped on by the driver;
   pedal control means for withdrawing the brake pedal when the pushing-up of the brake pedal is detected by the pedal pushing-up detection means;
   stepping state detection means for detecting the stepping state of the brake pedal;
   a master cylinder for generating brake oil of the fluid pressure depending on the stepping state of the brake pedal;
   a reservoir tank for storing brake oil;
   a pressurized fluid supply source for drawing the brake oil stored in the reservoir tank to pressurize the brake oil and for supplying the pressurized brake oil to wheel cylinders which respectively restrain the rotations of wheels of the vehicle;
   pressure increasing means for making the pressurized fluid supply source communicate with or blocked from the wheel cylinders;
   pressure reducing means for making the wheel cylinders communicate with or blocked from the reservoir tank;
   a stroke simulator communicating with the master cylinder for generating a reaction force of the brake pedal in dependence on the stepping state of the brake pedal which is detected by the stepping state detection means;
   simulator cutting means for making the master cylinder communicate with or blocked from the stroke simulator;
   master cylinder cutting means for making the master cylinder communicate with or blocked from the wheel cylinders; and wherein:
   when pressurized fluid is supplied from the pressurized fluid supply source, the vehicle is braked by bringing the master cylinder cutting means into a closed state and the simulator cutting means into an open state and by controlling the open/close operations of the pressure increasing means and the pressure reducing means in dependence on the stepping state detected by the stepping state detection means, when the pressurized fluid is not supplied from the pressurized fluid supply source, the vehicle is braked by the stepping manipulation of the brake pedal with the master cylinder cutting means being opened and with the simulator cutting means being closed, from a time point when a collision of the vehicle occurs to another time point when the pushing-up of the brake pedal is detected, the master cylinder cutting means is closed to restrain the draining of the brake oil from the master cylinder, and after the time point when the pushing-up of the brake pedal is detected, the draining of the brake oil from the master cylinder to the reservoir tank is adjusted by opening at least one of the master cutting means and by controlling the pressure reducing means so that the brake pedal is withdrawn as the stepping state of the brake pedal detected by the stepping state detection means is maintained in a predetermined state which has caused the pedal pushing-up detection means to detect the pushing-up of the brake pedal.

6. The vehicle brake device as set forth in claim 5, wherein:

the stroke simulator is of the construction that a predetermined pedal manipulation force to pedal stroke property is provided by means of the urging force of a main resilient member and is further provided with a sub-resilient member for generating its urging force in the same direction as the main resilient member does, when the pedal stepping force is less than a predetermined load, the stroke simulator provides the predetermined pedal manipulation force to pedal stroke property by means of the urging force of the main resilient member, and when the pedal stepping force is equal to or greater than the predetermined load, the stroke simulator provides by means of the urging force of the sub-resilient member another pedal manipulation force to pedal stroke property which is different from the predetermined pedal manipulation force to pedal stroke property and in which the length of stroke increases with increases in the stepping force.

7. The vehicle brake device as set forth in claim 5, wherein the pedal manipulation force to pedal stroke property of the stroke simulator has an ordinary property in which the pedal stroke increases with increases in the pedal manipulation force to come to be stable thereafter and a withdrawal property in which after coming to be stable, the pedal stroke increases again as the pedal manipulation force increases beyond a predetermined load.

8. The vehicle brake device as set forth in claim 5, wherein:

when being unable to maintain the stepping state of the brake pedal in the predetermined state due to a decrease in the quantity of the brake oil in the master cylinder, the pedal control means replenishes the brake oil from the fluid pressure supply source to the master cylinder so that the brake pedal is withdrawn as the stepping state of the brake pedal is maintained in the predetermined state.

9. The vehicle brake device as set forth in claim 5, wherein:

the master cylinder has two outlet ports communicating with the wheel cylinders;

pressurized fluid systems including the respective outlet ports are controllable independently of each other; and after a time point when the collision of the vehicle is detected by the collision detection means, the master cylinder and the wheel cylinders in one of the pressurized fluid systems are brought into blocking from each other, and the wheel cylinders and the pressurized fluid supply source are brought into communication, whereby the pressurized fluids in the wheel cylinders are maintained or increased in pressure.

* * * * *